United States Patent
Adema et al.

(10) Patent No.: US 11,971,556 B2
(45) Date of Patent: Apr. 30, 2024

(54) MEMS DEVICE WITH ELLIPTICAL MIRROR

(71) Applicant: GOOGLE LLC, Mountain View, CA (US)

(72) Inventors: Daniel Adema, Waterloo (CA); Sangtak Park, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 355 days.

(21) Appl. No.: 17/201,804

(22) Filed: Mar. 15, 2021

(65) Prior Publication Data

US 2022/0299758 A1 Sep. 22, 2022

Related U.S. Application Data

(60) Provisional application No. 63/115,946, filed on Nov. 19, 2020.

(51) Int. Cl.
| | | |
|---|---|---|
| *G02B 27/09* | (2006.01) | |
| *G02B 26/08* | (2006.01) | |
| *G02B 26/10* | (2006.01) | |
| *G02B 27/01* | (2006.01) | |

(52) U.S. Cl.
CPC ..... *G02B 27/0916* (2013.01); *G02B 26/0833* (2013.01); *G02B 26/0841* (2013.01); *G02B 26/101* (2013.01); *G02B 27/0172* (2013.01); *G02B 27/0955* (2013.01); *G02B 27/0966* (2013.01); *G02B 2027/0154* (2013.01); *G02B 2027/0178* (2013.01)

(58) Field of Classification Search
CPC ........... G02B 27/0916; G02B 26/0833; G02B 26/0841; G02B 26/101; G02B 27/0172; G02B 27/0955; G02B 27/0966; G02B 2027/0154; G02B 2027/0178
USPC ........................................................ 359/207.6
See application file for complete search history.

(56) References Cited

U.S. PATENT DOCUMENTS

| | | | | |
|---|---|---|---|---|
| 2004/0017518 | A1* | 1/2004 | Stern ..................... | H04L 27/156 |
| | | | | 348/789 |
| 2006/0007362 | A1* | 1/2006 | Lee ..................... | G02B 17/008 |
| | | | | 348/E9.026 |
| 2006/0262179 | A1* | 11/2006 | Tan ..................... | G02B 26/101 |
| | | | | 348/E9.026 |

(Continued)

OTHER PUBLICATIONS

Zhang et al. "Dual-fiber collimator with elliptical spot for optical MEMS devices" Applied Optics, vol. 50, No. 16, pp. 2334-2341 (Year: 2011).*

*Primary Examiner* — George G. King

(57) ABSTRACT

Optical systems may include MEMS mirrors having elliptical mirror plates. A laser scanning system may include a MEMS mirror that scans an incident light beam along a single scanning axis. The MEMS mirror may include an elliptical mirror plate having a semi-major axis that is aligned parallel or perpendicular to the rotational axis of the elliptical mirror plate. The incident light beam may have an elliptical cross-section, such that the incident light beam completely or substantially overlaps the reflecting surface of the elliptical mirror plate. After being reflected by the elliptical mirror plate, the light beam may be circularized via one or more shaping lenses disposed in the optical path of the reflected light beam, prior to projection of the light beam.

21 Claims, 12 Drawing Sheets

(56) References Cited

U.S. PATENT DOCUMENTS

2019/0286231 A1 9/2019 Burns et al.
2020/0133006 A1 4/2020 Eash et al.

* cited by examiner

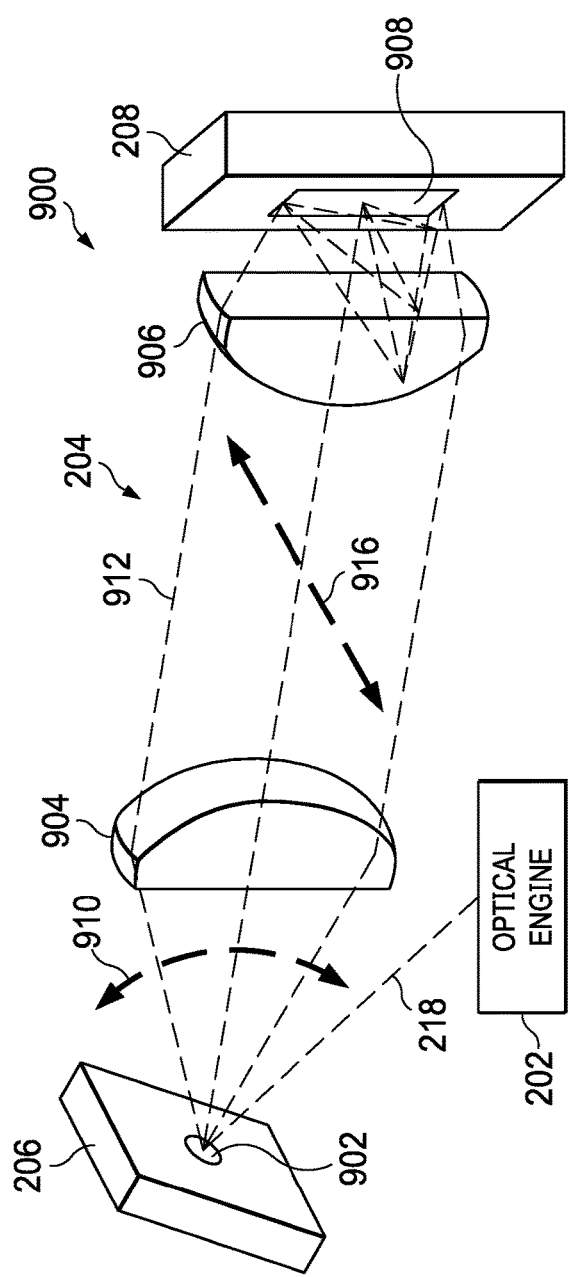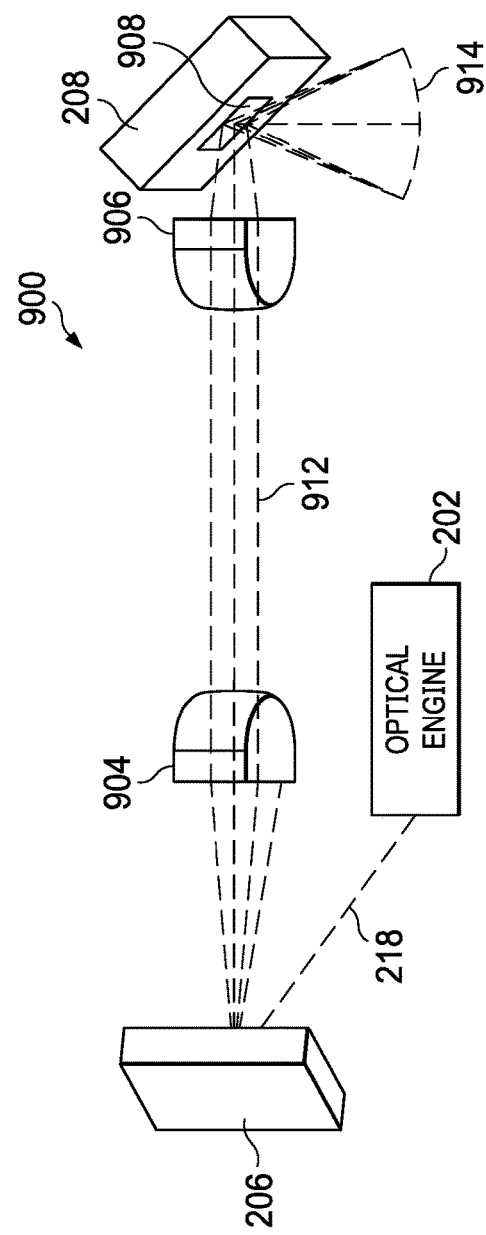

MEMS DEVICE WITH ELLIPTICAL MIRROR

CROSS-REFERENCE TO RELATED APPLICATIONS

The present application claims priority to U.S. Provisional Patent Application No. 63/115,946, titled "MEMS DEVICE WITH ELLIPTICAL MIRROR," filed on Nov. 19, 2020, which is incorporated by reference herein in its entirety.

BACKGROUND

Optical devices such as laser projectors generally route light from a source, such as a laser diode, to a destination, such as a display area in the case of a laser projector. Such laser projectors may include mirrored micro electro-mechanical system (MEMS) devices. The laser projector controls oscillation of the MEMS devices to scan received laser light over a display area, for example. However, existing MEMS mirror devices limit the type, size, and/or shape of laser light that can be efficiently reflected, limiting the overall flexibility and efficiency of the devices.

SUMMARY

In an example embodiment, a system, for example a laser scanning system, includes an optical engine configured to emit a light beam having an elliptical cross-section and a first micro-electromechanical system (MEMS) mirror that includes an elliptical mirror plate and that is configured to oscillate the elliptical mirror plate to reflect the light beam along a first scanning axis.

In some embodiments, the laser scanning system further includes at least one shaping lens configured to the light beam upon reflection of the light beam by the elliptical mirror plate of the first MEMS mirror and that is configured to reshape the light beam to have a substantially circular cross-section to produce a circular light beam.

In some embodiments, the laser scanning system further includes a second MEMS mirror configured to scan the circular light beam along a second scanning axis that is orthogonal to the first scanning axis.

In some embodiments, the major axes of the elliptical mirror plate of the first MEMS mirror and of the elliptical cross-section of the light beam are longer than their respective minor axes.

In some embodiments, the elliptical cross-section of the light beam, upon being incident on the elliptical mirror plate, substantially overlaps an elliptical reflective surface of the elliptical mirror plate.

In some embodiments, the optical engine includes at least one laser light source configured to generate and output the light beam. For example, the optical engine includes an edge-emitting semiconductor laser.

In some embodiments, a minor axis of the elliptical mirror plate is substantially orthogonal to an axis of rotation of the elliptical mirror plate.

In some embodiments, a major axis of the elliptical mirror plate is substantially orthogonal to an axis of rotation of the elliptical mirror plate.

In some embodiments, the minor axis of the elliptical mirror plate is approximately half as long as the major axis of the elliptical mirror plate.

In an example embodiment, a system includes a first micro-electromechanical system (MEMS) mirror comprising an elliptical mirror plate and being configured to receive a light beam and to oscillate the elliptical mirror plate to reflect the light beam along a first scanning axis, and at least one shaping lens configured to receive the light beam from the first MEMS mirror and configured to receive the light beam to have a substantially circular cross-section to produce a circular light beam.

In some embodiments, the system further includes a second MEMS mirror configured to scan the circular light beam along a second scanning axis that is substantially orthogonal to the first scanning axis.

In some embodiments, a major axis of the elliptical mirror plate is substantially orthogonal to an axis of rotation of the elliptical mirror plate.

In some embodiments, a minor axis of the elliptical mirror plate is substantially orthogonal to an axis of rotation of the elliptical mirror plate.

In some embodiments, the minor axis of the elliptical mirror plate is approximately half as long as the major axis of the elliptical mirror plate.

In some embodiments, the system comprises a controller configured to control a timing of emission of the light beam from the optical engine for modulating the light beam to be perceived as images when output at an output of the system. For example, the controller may control the timing of emission of laser light from a laser light source of the optical engine in accordance with instructions received by the controller from a computer processor coupled thereto to modulate the laser light to be perceived as images when output to a retina of an eye of a user.

In some embodiments, the optical engine is configured to modulate an intensity of the laser light beam for generating combined laser light reflecting a series of pixels of an image. For example, laser light used to form a perceptible image or series of images may be projected by the system onto an eye of the user via a series of optical elements, such as a waveguide formed at least partially in a lens element of the system, one or more scan mirrors of the system, and one or more optical relays of the system.

In some embodiments, the system further comprises two rotors coupled to the elliptical mirror plate; a first stator that is disposed on a substrate and that is capacitively coupled to the two rotors; and a second stator that is disposed on the substrate and that is capacitively coupled to the two rotors, wherein the first stator and the second stator drive are configured to oscillation of the elliptical mirror plate.

In an example embodiment, a display system comprises a proposed system with a first MEMS mirror and at least one waveguide coupled to an output of the system, wherein the at least one waveguide is configured to project a light beam received at the output to a display area or onto an eye of a user. For example, the at least one waveguide may comprise an incoupler coupled the output, an outcoupler that outputs the light beam toward the display area or the eye of the user, and at least one portion that routes the light beam received by the incoupler of the waveguide to the outcoupler of the waveguide.

In some embodiments, the display system comprises a wearable-heads-up display to provide an augmented reality display in which the light beam from the optical engine is used to form a perceptible image or series of images onto an eye of a user wearing the wearable-heads-up display.

In an example embodiment, a micro-electromechanical system (MEMS) mirror (and thus a corresponding MEMS device) includes an elliptical mirror plate configured to oscillate about a rotational axis, two rotors coupled to the elliptical mirror plate, a first stator that is disposed on a substrate and that is capacitively coupled to the two rotors, and a second stator that is disposed on the substrate and that is capacitively coupled to the two rotors. The first stator and the second stator drive are configured to oscillation of the elliptical mirror plate.

In some embodiments, the first stator includes a first plurality of comb drivers, the second stator includes a second plurality of comb drivers, and the first plurality of comb drivers and the second plurality of comb drivers are configured to drive oscillation of the elliptical mirror plate.

In some embodiments, the MEMS device further comprises at least two torsional bars configured to couple the two rotors to the substrate such that the elliptical mirror plate is suspended from the at least two torsional bars.

In some embodiments, major axis of the elliptical mirror plate is longer than minor axis of the elliptical mirror plate.

In some embodiments, the major axis of the elliptical mirror plate is substantially orthogonal to a rotational axis of the elliptical mirror plate.

In some embodiments, the minor axis of the elliptical mirror plate is approximately half as long as the major axis of the elliptical mirror plate.

In an example embodiment, a method includes steps for, receiving, with a first micro-electromechanical system (MEMS) mirror having an elliptical mirror plate, a light beam and oscillating the elliptical mirror plate to reflect the light beam along a first scanning axis.

In some embodiment, the method further comprises reflecting, with the first MEMS mirror, the light beam toward at least one shaping lens.

In some embodiments, the method further includes steps for, reshaping, with the at least one shaping lens in response to receiving the light beam from the first MEMS mirror, reshaping the light beam to have a substantially circular cross-section to produce a circular light beam.

In some embodiments, the method further includes steps for, receiving, with a second MEMS mirror, the circular light beam from the at least one shaping lens, and, reflecting, with the second MEMS mirror, the circular light beam along a second scanning axis that is substantially orthogonal to the first scanning axis.

In some embodiments, the method further includes steps for, oscillating, with the first MEMS mirror, the elliptical mirror plate at a resonant frequency of the first MEMS mirror to scan the light beam along the first scanning axis.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 9 is a side perspective view of a laser scanning system that includes an elliptical micro-electromechanical system (MEMS) mirror, in accordance with some embodiments.

FIG. 10 is a top perspective view of a laser scanning system that includes an elliptical MEMS mirror, in accordance with some embodiments.

DETAILED DESCRIPTION

The present disclosure describes systems and methods for providing systems, for example laser scanning systems, that include MEMS devices with elliptical mirror plates. By employing elliptical mirrors, the MEMS devices support the use of elliptical light beams for display projection. For example, the elliptical shape of the MEMS mirror plates described herein provides various advantages for the MEMS mirror itself, including a higher resonant frequency, less dynamic deformation, less squeeze-film damping, and less power consumption, while supporting efficient use of the reflective surface of the mirror and reducing clipping of incident elliptical laser light. Herein, the terms "ellipse" and "elliptical" refer to non-circular ellipses and non-circular elliptical shapes. That is, an elliptical light beam or elliptical mirror, as defined herein, has a diameter along its major axis that is greater than the diameter along its minor axis.

According to the various embodiments described herein, a laser projector may include a MEMS device (sometimes referred to herein as a "MEMS mirror", an "elliptical MEMS mirror", or a "MEMS die") having an elliptical mirror plate. The MEMS mirror may be a resonant MEMS mirror. The MEMS mirror may be positioned within an optical system, such as a laser scanning system, and may receive an elliptical light beam that substantially overlaps the elliptical mirror plate. During operation, the MEMS mirror is actuated (e.g., via an electrode disposed near the elliptical mirror plate), causing the elliptical mirror plate to oscillate along a single axis of rotation/rotational axis, and scanning received light along a defined scan direction. In some embodiments, the semi-major axis of the elliptical mirror plate may be parallel with the rotational axis of the MEMS mirror. In other embodiments, the semi-major axis of the elliptical mirror plate may be perpendicular to the rotational axis of the MEMS mirror.

Embodiments of the elliptical MEMS mirrors described herein may be particularly applicable for optical systems that utilize light beams having elliptical cross-sections. For example, an edge-emitting semiconductor laser (EEL) advantageously provides high optical power in a small form factor, but has an inherent elliptical beam profile, which typically must be corrected to a more ideal circular beam profile by a collimating or shaping lens before being provided to a circular mirror.

It should be noted that, although some embodiments of the present disclosure are described and illustrated with reference to a particular example near-eye display system in the form of a wearable-heads-up display (WHUD), it will be appreciated that the apparatuses and techniques of the present disclosure is not limited to this particular example, but instead may be implemented in any of a variety of display systems using the guidelines provided herein.

Figure 1:
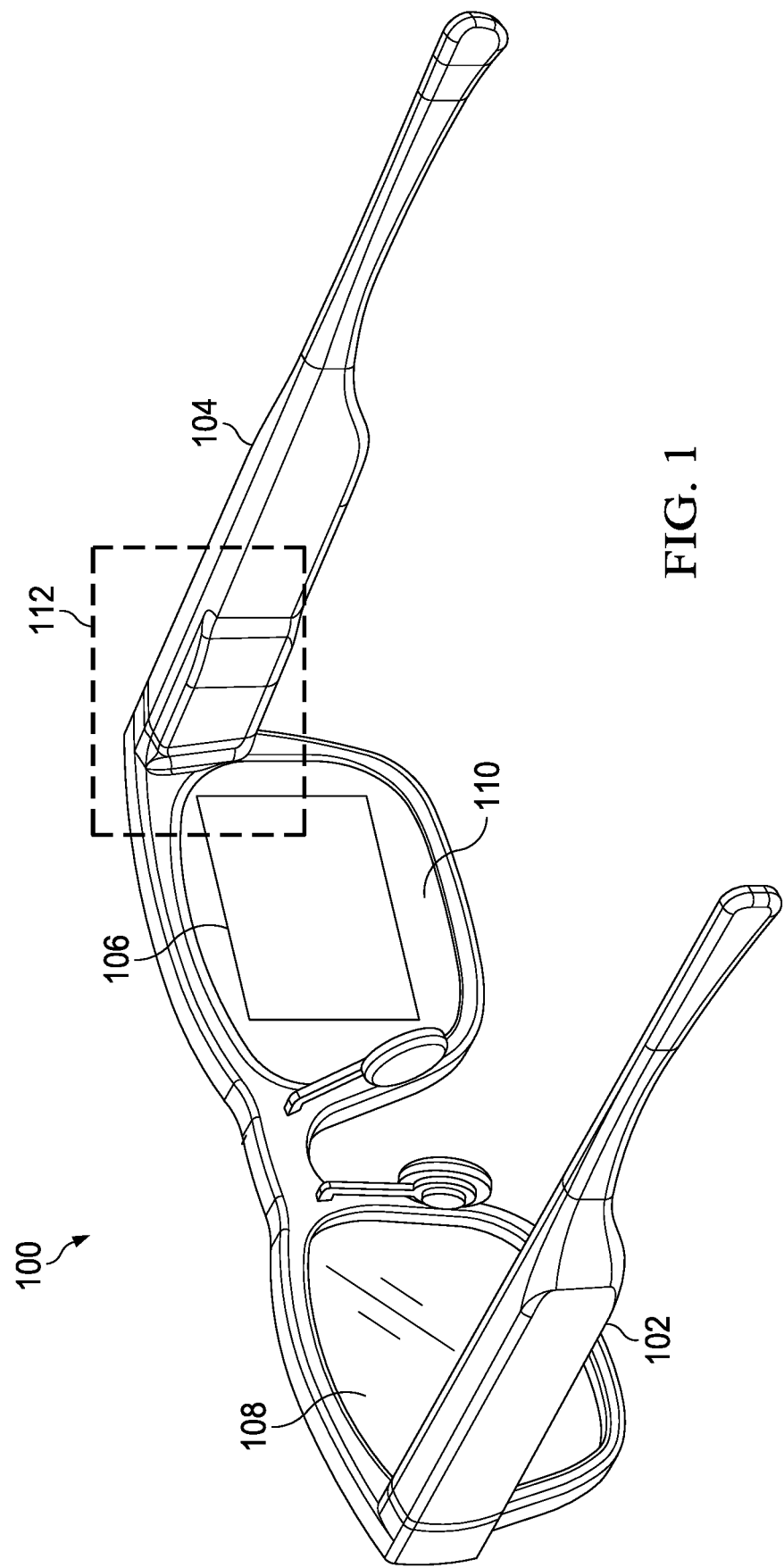
FIG. 1 is a diagram illustrating a display system having an integrated laser scanning system, in accordance with some embodiments.

FIG. 1 illustrates an example display system 100 employing a scanning-based optical system in accordance with some embodiments having support structure 102 that includes an arm 104, which houses a laser scanning system configured to project images toward the eye of a user, such that the user perceives the projected images as being displayed in a field of view (FOV) area 106 of a display at one or both of lens elements 108, 110. In the depicted embodiment, the display system 100 a near-eye display system in the form of a WHUD in which the support structure 102 is configured to be worn on the head of a user and has a general shape and appearance (that is, form factor) of an eyeglasses (e.g., sunglasses) frame. The support structure 102 contains or otherwise includes various components to facilitate the projection of such images toward the eye of the user, such as a laser projector (also referred to herein as a "laser scanning system") with an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a laser projector, or any combination of a modulative light source such as a laser or one or more light emitting diodes (LEDs) and a dynamic reflector mechanism such as one or more dynamic scanners or digital light processors. In some embodiments, the projector includes multiple laser diodes (e.g., a red laser diode, a green laser diode, and a blue laser diode) and at least one scan mirror (e.g., two one-dimensional scan mirrors, which may be MEMS-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
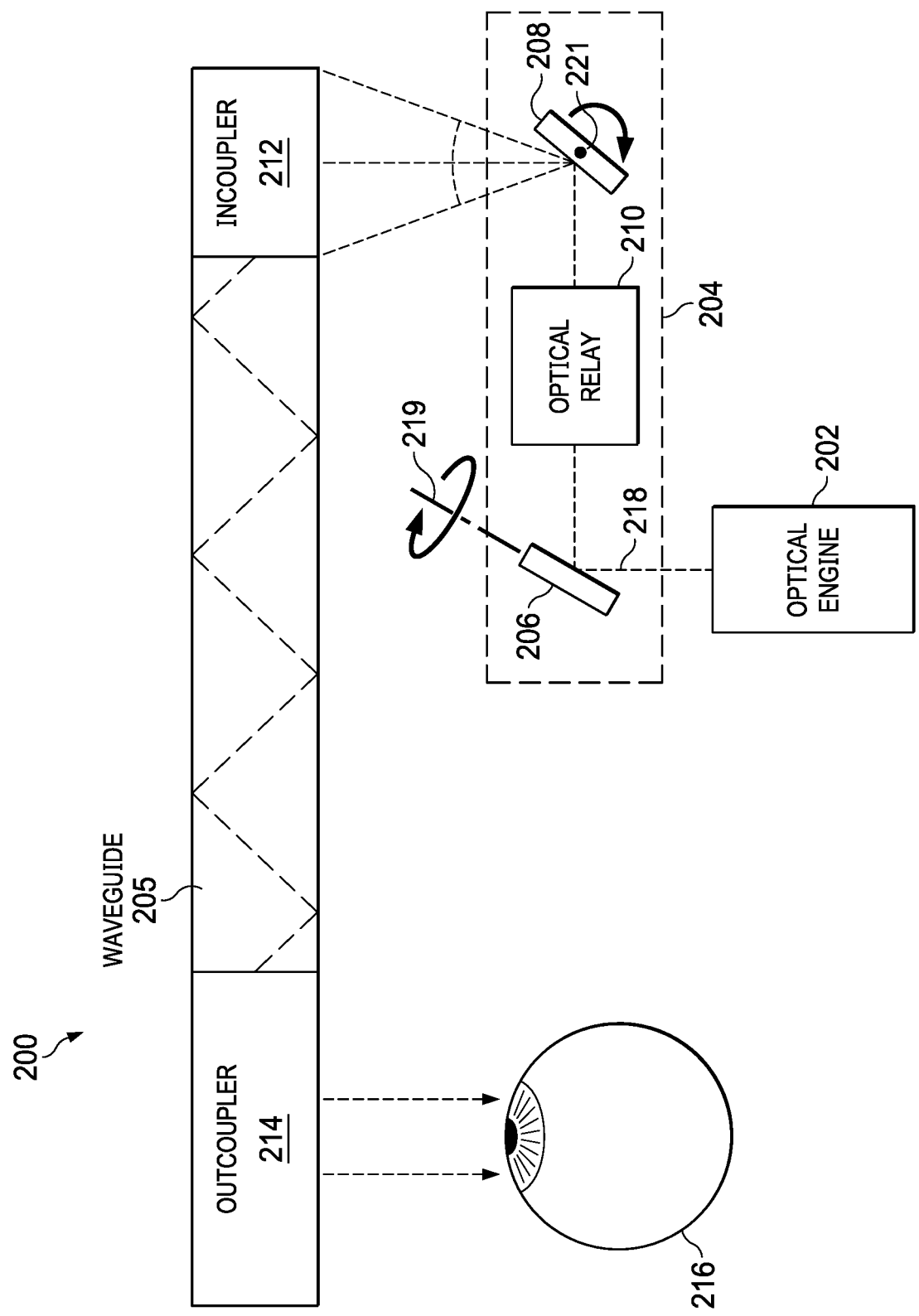
FIG. 2 is a diagram illustrating a laser scanning system having an optical scanner that includes an optical relay disposed between two scan mirrors, in accordance with some embodiments

FIG. 2 illustrates a simplified block diagram of a laser scanning system 200 that projects images directly onto the eye of a user via laser light. The laser scanning system 200 includes an optical engine 202, an optical scanner 204, and a waveguide 205. The optical scanner 204 includes a first scan mirror 206, a second scan mirror 208, and an optical relay 210. In some embodiments, the first scan mirror 206 includes a mirror plate having a reflective surface with non-circular elliptical shape. That is, the first scan mirror 206 may be an elliptical MEMS mirror. The waveguide 205 includes an incoupler 212 and an outcoupler 214, with the outcoupler 214 being optically aligned with an eye 216 of a user in the present example. In some embodiments, the laser scanning system 200 is implemented in a wearable heads-up display or other display system, such as the display system 100 of FIG. 1.

The optical engine 202 includes one or more laser light sources configured to generate and output laser light 218 (e.g., visible laser light such as red, blue, and green laser light and, in some embodiments, non-visible laser light such as infrared laser light). The laser light 218 is sometimes referred to herein as a "light beam 218". In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during operation of the laser scanning system 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

One or both of the first and second scan mirrors 206 and 208 of the optical scanner 204 are MEMS mirrors in some embodiments. For example, the first scan mirror 206 and the second scan mirror 208 are MEMS mirrors that are driven by respective actuation voltages to oscillate during active operation of the laser scanning system 200, causing the first and second scan mirrors 206 and 208 to scan the laser light 218. Oscillation of the first scan mirror 206 causes laser light 218 output by the optical engine 202 to be scanned through the optical relay 210 and across a surface of the second scan mirror 208. The second scan mirror 208 scans the laser light 218 received from the first scan mirror 206 toward an incoupler 212 of the waveguide 205. In some embodiments, the first scan mirror 206 oscillates or otherwise rotates around a first axis 219, such that the laser light 218 is scanned in only one dimension (i.e., in a line) across the surface of the second scan mirror 208. In some embodiments, the second scan mirror 208 oscillates or otherwise rotates around a second axis 221. In some embodiments, the first axis 219 is skew with respect to the second axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 in the first dimension to an exit pupil beyond the second scan mirror 208. Herein, an "exit pupil" in an optical system refers to the location along the optical path where beams of light intersect. For example, the possible optical paths of the laser light 218, following reflection by the first scan mirror 206, are initially spread along a first scanning axis, but later these paths intersect at an exit pupil beyond the second scan mirror 208 due to convergence introduced by the optical relay 210. For example, the width (i.e., smallest dimension) of a given exit pupil approximately corresponds to the diameter of the laser light corresponding to that exit pupil. Accordingly, the exit pupil can be considered a "virtual aperture". According to various embodiments, the optical relay 210 includes one or more collimation lenses that shape and focus the laser light 218 on the second scan mirror 208 or includes a molded reflective relay that includes two or more spherical, aspheric, parabolic, or freeform lenses that shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes at least one EEL light source that emits a laser light 218 having a substantially elliptical, non-circular cross-section, and the optical relay 210 magnifies or minimizes the laser light 218 along its semi-major or semi-minor axis to circularize the laser light 218 prior to convergence of the laser light 218 on the second scan mirror 208. In some such embodiments, a surface of a mirror plate of the first scan mirror 206 is elliptical and non-circular (e.g., similar in shape and size to the cross-sectional area of the laser light 218). In other such embodiments, the surface of the mirror plate of the first scan mirror 206 is circular.

The waveguide 205 of the laser scanning system 200 includes the incoupler 212 and the outcoupler 214. The term "waveguide," as used herein, will be understood to mean a combiner using one or more of total internal reflection (TIR), specialized filters, or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens element 108 or the lens element 110 (FIG. 1) of the display system having an eyeglass form factor and employing the laser scanning system 200.

Although not shown in the example of FIG. 2, in some embodiments additional optical components are included in any of the optical paths between the optical engine 202 and the first scan mirror 206, between the first scan mirror 206 and the optical relay 210, between the optical relay 210 and the second scan mirror 208, between the second scan mirror 208 and the incoupler 212, between the incoupler 212 and the outcoupler 214, or between the outcoupler 214 and the eye 216 (e.g., in order to shape the laser light for viewing by the eye 216 of the user). In some embodiments, a prism is used to steer light from the second scan mirror 208 into the incoupler 212 so that light is coupled into incoupler 212 at the appropriate angle to encourage propagation of the light in waveguide 205 by TIR. Also, in some embodiments, an exit pupil expander (e.g., an exit pupil expander 304 of FIG. 3, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
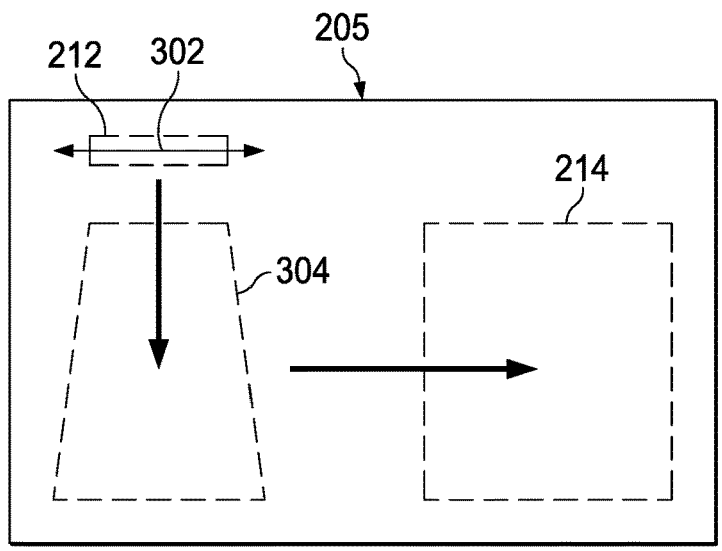
FIG. 3 is a diagram illustrating a waveguide having an incoupler, outcoupler, and exit pupil expander, in accordance with some embodiments.

FIG. 3 shows an example of light propagation within the waveguide 205 of the laser scanning system 200 of FIG. 2 in accordance with some embodiments. As shown, light received via the incoupler 212, which is scanned along the scanning axis 302, is directed into an exit pupil expander 304 and is then routed to the outcoupler 214 to be output (e.g., toward the eye of the user). In some embodiments, the exit pupil expander 304 expands one or more dimensions of the eyebox of a WHUD that includes the laser scanning system 200 (e.g., with respect to what the dimensions of the eyebox of the WHUD would be without the exit pupil expander 304). In some embodiments, the incoupler 212 and the exit pupil expander 304 each include respective one-dimensional diffraction gratings (i.e., diffraction gratings that extend along one dimension), which diffract incident light in a particular direction depending on the angle of incidence of the incident light and the structural aspects of the diffraction gratings. It should be understood that FIG. 3 shows a substantially ideal case in which the incoupler 212 directs light straight down (with respect to the presently illustrated view) in a first direction that is perpendicular to the scanning axis 302, and the exit pupil expander 304 directs light to the right (with respect to the presently illustrated view) in a second direction that is perpendicular to the first direction. While not shown in the present example, it should be understood that, in some embodiments, the first direction in which the incoupler 212 directs light is slightly or substantially diagonal, rather than exactly perpendicular, with respect to the scanning axis 302.

Figure 4:
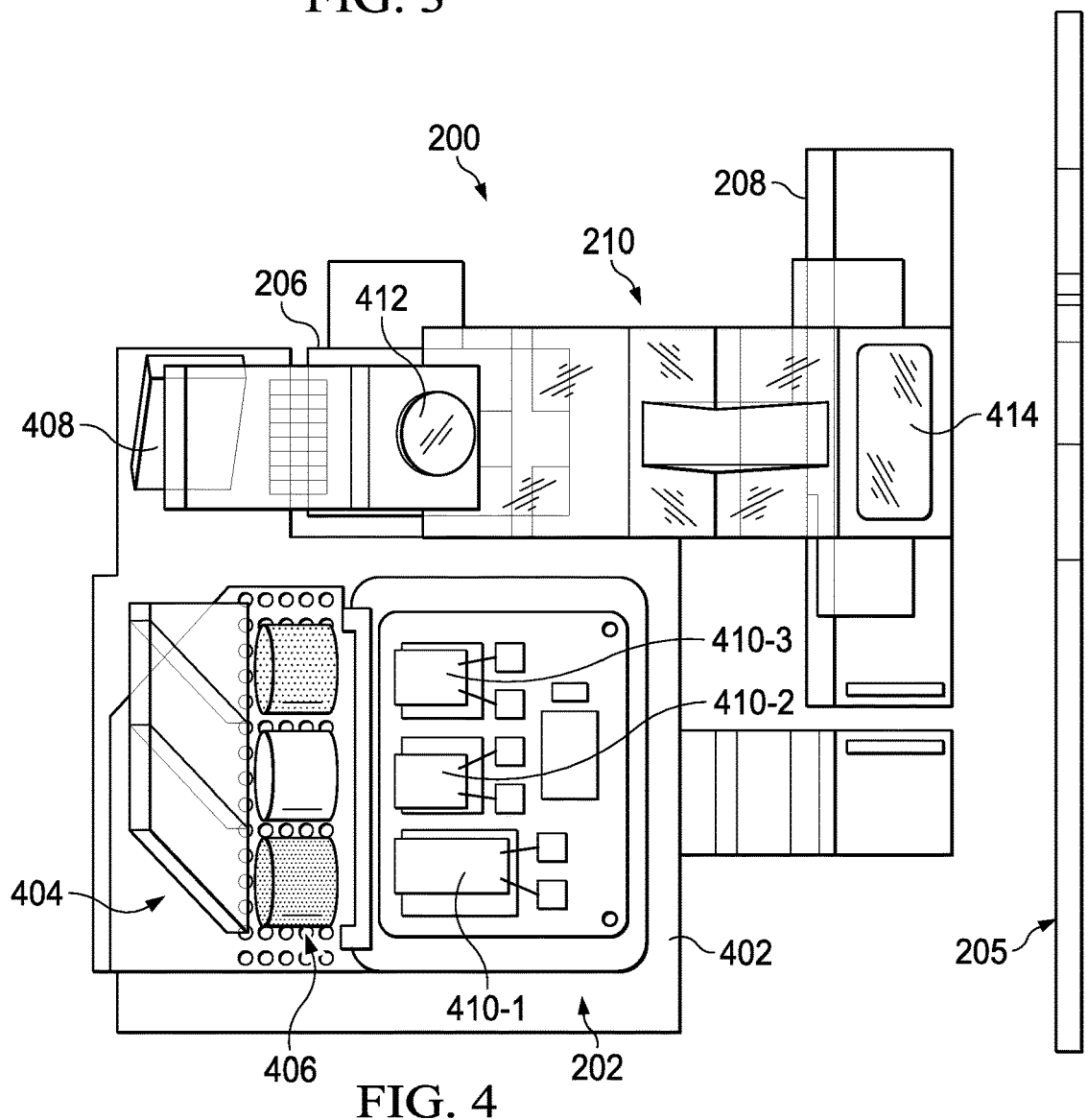
FIG. 4 is a diagram illustrating a laser scanning system that includes a molded reflective relay disposed between two scan mirrors, in accordance with some embodiments.

FIG. 4 shows an example embodiment of the laser scanning system 200 in which the optical relay 210 includes a molded reflective relay. As shown, the laser scanning system 200 includes a substrate 402 on which a beam combiner 404, primary lenses 406, and a mirror 408 are disposed. According to various embodiments, the substrate 402 is a printed circuit board (PCB) or otherwise another applicable substrate.

The optical engine 202 comprises a set of one or more laser light sources 410 (e.g., laser diodes), such as the illustrated red laser light source 410-1, green laser light source 410-2, and blue laser light source 410-3, wherein a processor or other controller operates the optical engine 202 to modulate the respective intensity of each laser light source 410 so as to provide a corresponding red light, green light, and blue light contribution to a corresponding pixel of an image being generated for display to the user. The primary lenses 406 includes a corresponding number of collimation lenses (e.g., three for the three laser light sources 410 in the example above), each interposed in the light path between a respective laser light source 410 of the optical engine 202 and the beam combiner 404. For example, each laser light source 410 outputs a different wavelength of laser light (e.g., corresponding to respective red, blue, and green wavelengths) through the primary lenses 406 to be combined at the beam combiner 404 to produce the laser light (i.e., laser light 218 shown in FIG. 2) to be projected by the laser scanning system 200. The beam combiner 404 receives the individual laser light inputs and outputs a combined laser light 218 to the mirror 408, which redirects the laser light 218 onto a reflective surface 412 of the first scan mirror 206. The first scan mirror 206 scans the laser light 218 into the optical relay 210 across a first scanning axis.

In the example of FIG. 4, the optical relay 210 is a molded reflective relay, which may be, for example, molded from a solid clear component (e.g., glass or an optical plastic such as Zeonex) and the reflective surfaces thereof are implemented as mirror coatings or metasurfaces. Such molding can simplify fabrication of the laser scanning system 200 as it facilitates the incorporation of some or all of the optical surfaces of the relay into a single element, rather than several distinct, separate elements.

The optical relay 210 is configured to route the laser light 218 toward a reflective surface 414 of the second scan mirror 208. The second scan mirror 208 scans the laser light 218 across the incoupler (such as the incoupler 212) of the waveguide 205 along a second scanning axis. In some embodiments, the second scanning axis is perpendicular to the plane along which the laser light propagates through the optical relay 210.

Figure 5:
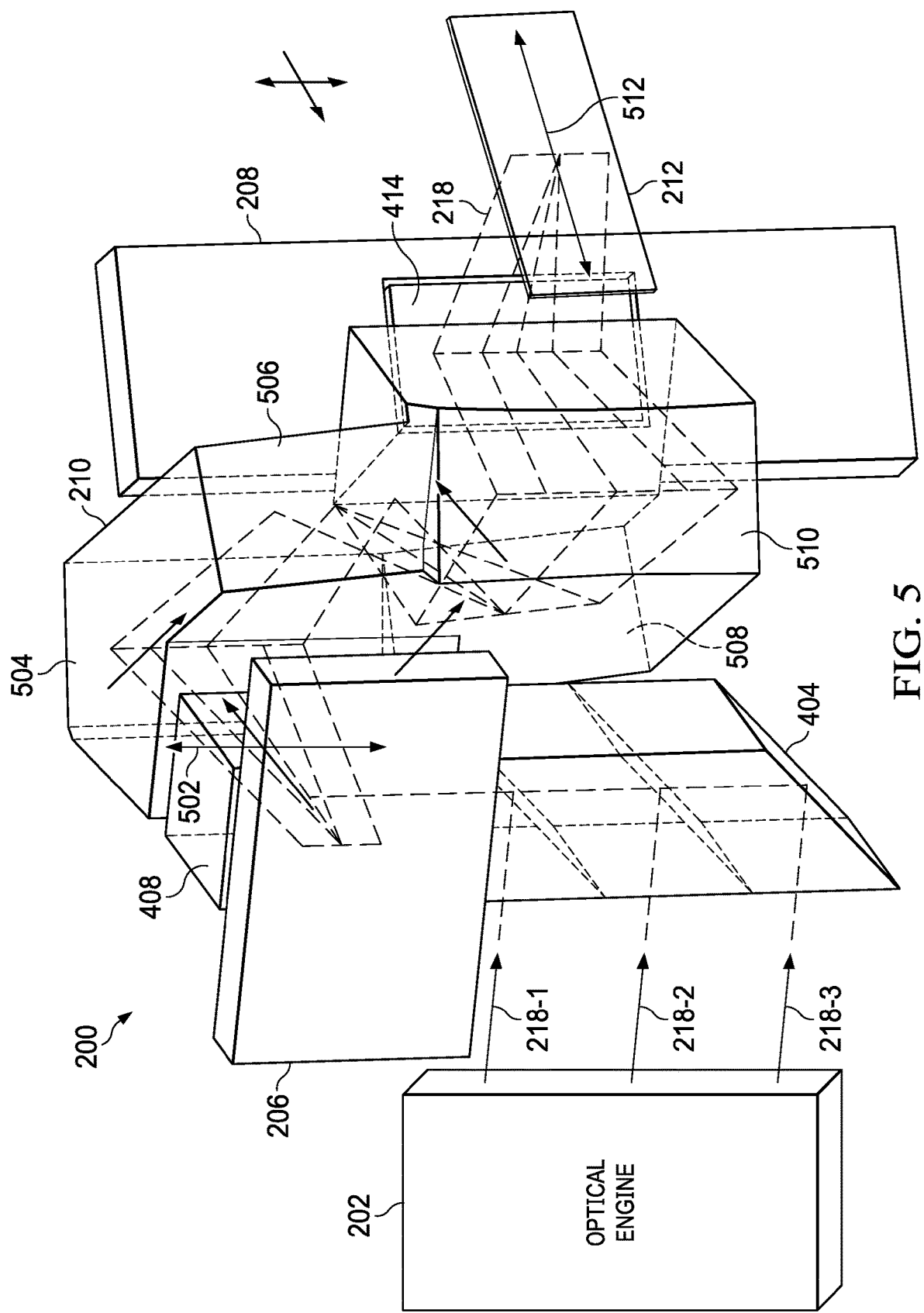
FIG. 5 is a diagram illustrating a laser scanning system that includes a molded reflective relay disposed between two scan mirrors, and illustrating optical paths through the molded reflective relay, in accordance with some embodiments.

FIG. 5 shows an example of paths that the concurrent laser lights output by the optical engine 202 can take through the optical relay 210 for an embodiment in which the optical relay 210 is a molded reflective relay. As shown, the optical engine 202 outputs red laser light 218-1, green laser light 218-2, and blue laser light 218-3 toward the beam combiner 404. The beam combiner 404 combines individual beams of the laser light 218-1, 218-2, 218-3 into the laser light 218, and redirects the laser light 218 toward the mirror 408, which reflects the laser light 218 onto the first scan mirror 206. The first scan mirror 206 scans the laser light 218 along a first scanning axis 502 into the optical relay 210. The optical relay 210 reflects the laser light 218 off of reflective surfaces 504, 506, 508, and 510, then outputs the laser light 218 toward the reflective surface 414 of the second scan mirror 208. The second scan mirror 208 then scans the laser light 218 across the incoupler 212 along a second scanning axis 512, where the laser light 218 converges onto the incoupler 212 at most or all achievable scan angles of the first scan mirror 206.

Figure 6:
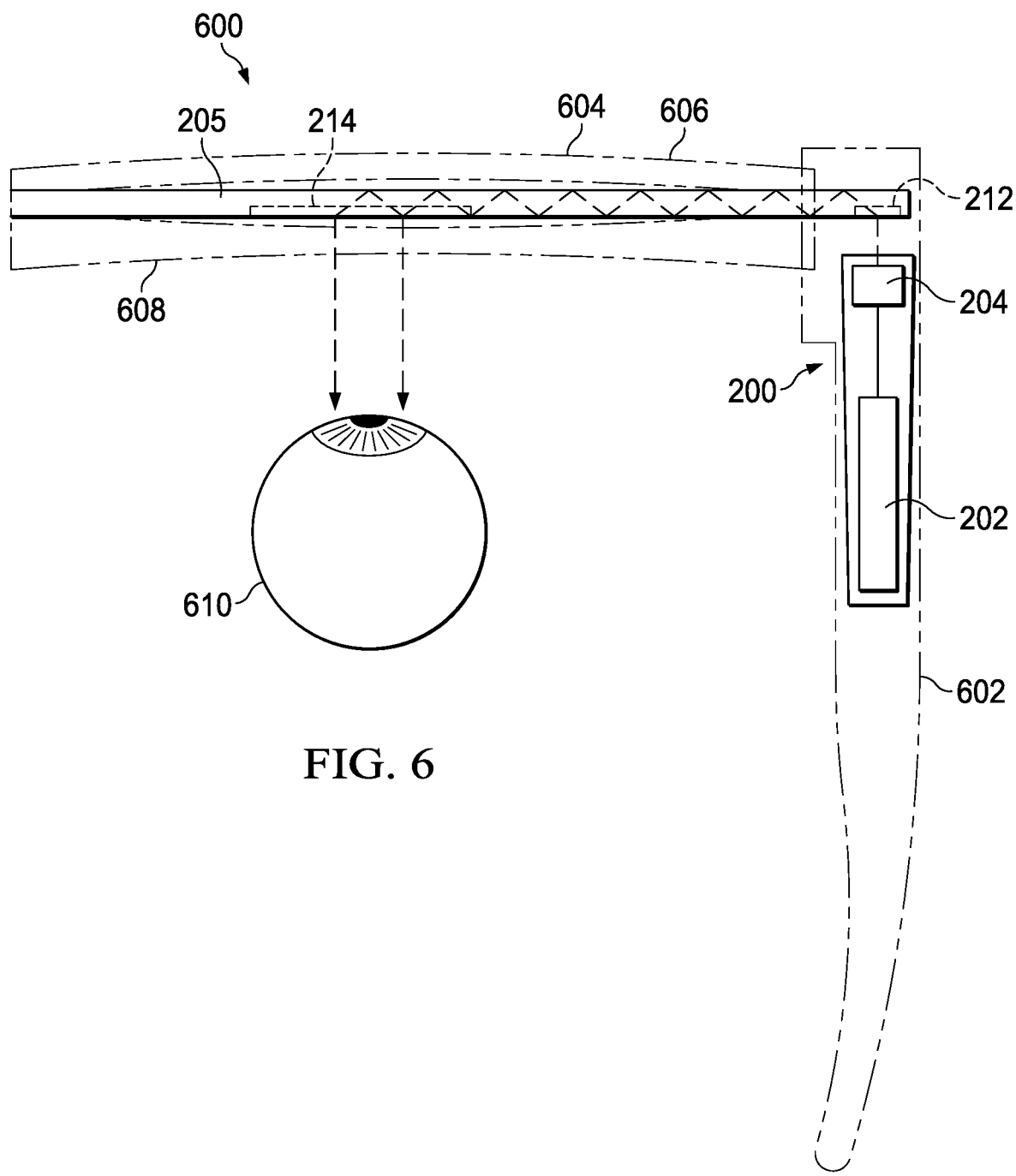
FIG. 6 is a diagram illustrating a partially transparent view of a display system that includes a laser scanning system, in accordance with some embodiments.

FIG. 6 illustrates a portion of a WHUD 600 that includes the laser scanning system 200 of FIG. 2. In some embodiments, the WHUD 600 represents the display system 100 of FIG. 1. The optical engine 202, the optical scanner 204, the incoupler 212, and a portion of the waveguide 205 are included in an arm 602 of the WHUD 600, in the present example.

The WHUD 600 includes an optical combiner lens 604, which includes a first lens 606, a second lens 608, and the waveguide 205, with the waveguide 205 disposed between the first lens 606 and the second lens 608. Light exiting through the outcoupler 214 travels through the second lens 608 (which corresponds to, for example, the lens element 110 of the display system 100). In use, the light exiting the second lens 608 enters the pupil of an eye 610 of a user wearing the WHUD 600, causing the user to perceive a displayed image carried by the laser light output by the optical engine 202. The optical combiner lens 604 is substantially transparent, such that light from real-world scenes corresponding to the environment around the WHUD 600 passes through the first lens 606, the second lens 608, and the waveguide 205 to the eye 610 of the user. In this way, images or other graphical content output by the laser scanning system 200 are combined (e.g., overlayed) with real-world images of the user's environment when projected onto the eye 610 of the user to provide an AR experience to the user.

Although not shown in the depicted example, in some embodiments additional optical elements are included in any of the optical paths between the optical engine 202 and the incoupler 212, in between the incoupler 212 and the outcoupler 214, or in between the outcoupler 214 and the eye 610 of the user (e.g., in order to shape the laser light for viewing by the eye 610 of the user). As an example, a prism is used to steer light from the optical scanner 204 into the incoupler 212 so that light is coupled into incoupler 212 at the appropriate angle to encourage propagation of the light in waveguide 205 by TIR. Also, in some embodiments, an exit pupil expander (e.g., the exit pupil expander 304), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 610 of the user).

Figure 7:
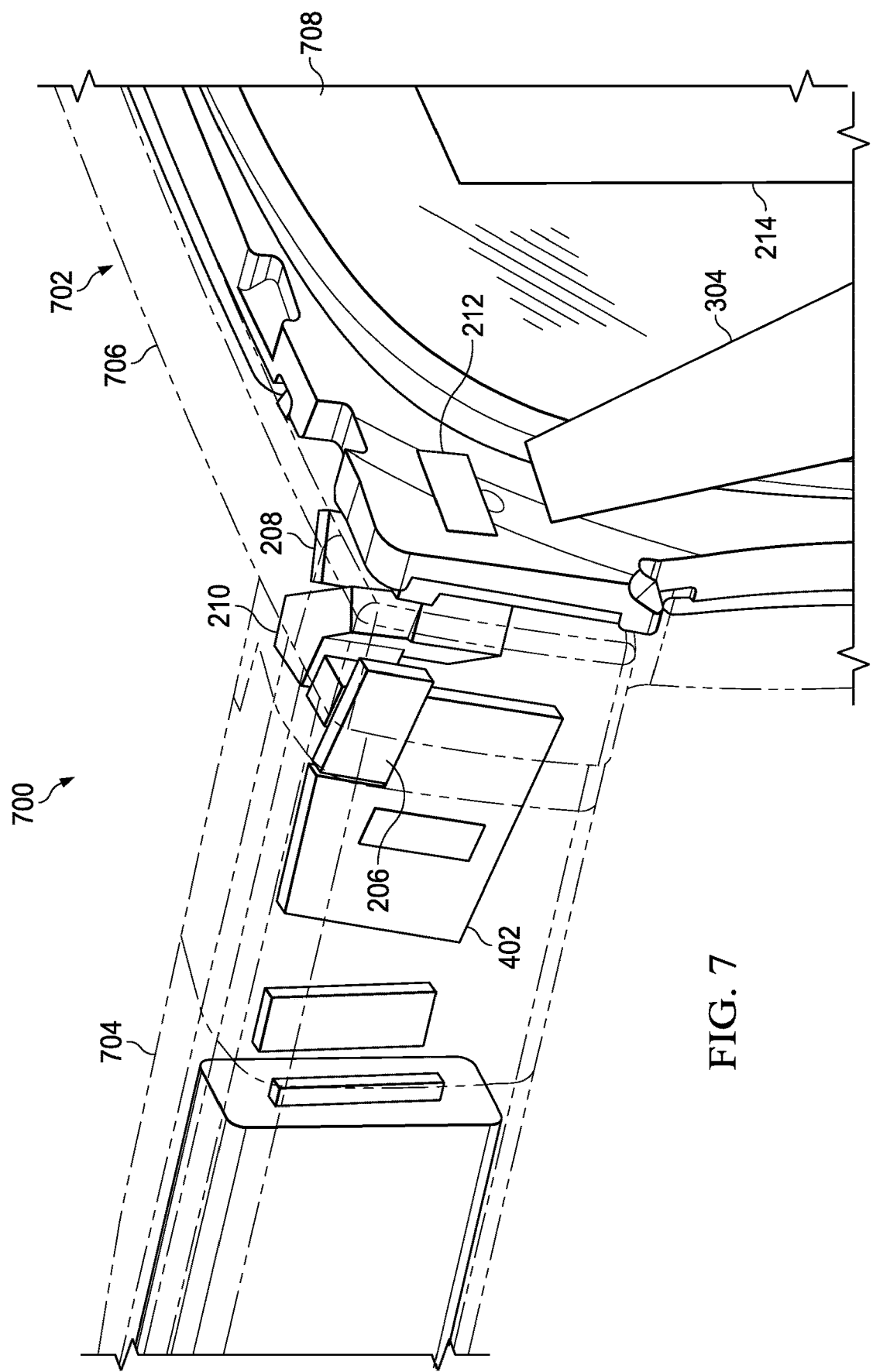
FIG. 7 is a diagram illustrating a partially transparent front isometric view of a laser scanning system disposed within a wearable-heads-up display (WHUD), in accordance with some embodiments.
Figure 8:
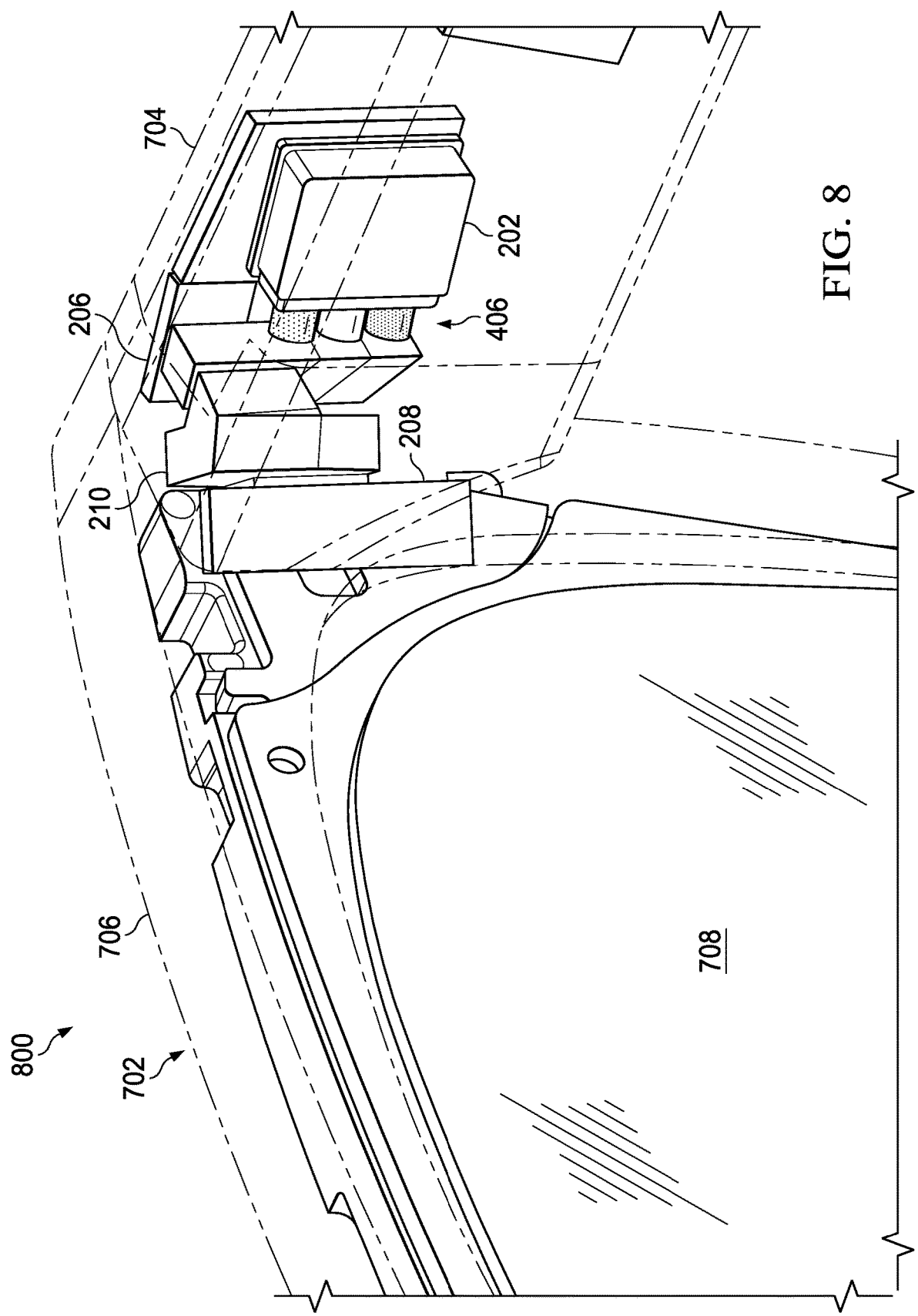
FIG. 8 is a diagram illustrating a partially transparent rear isometric view of a laser scanning system disposed within a WHUD, in accordance with some embodiments.

FIGS. 7 and 8 show two different perspective, partially transparent views 700 (FIG. 7) and 800 (FIG. 8) of a portion of a WHUD 702, which represents the WHUD 600 of FIG. 6 or the display system 100 of FIG. 1. The WHUD 702 includes an example arrangement of the laser scanning system 200 of FIGS. 2, 4, and 5 for an embodiment in which the optical relay 210 is a molded reflective relay. In some embodiments, the WHUD 702 corresponds to the display system 100 of FIG. 1, and the illustrated portion of the WHUD 702 corresponds to the region 112 of the display system 100.

As shown by the views 700 of FIG. 7 and 800 of FIG. 8, the arm 704 of the WHUD 702 houses the optical engine 202, the primary lenses 406 and at least a portion of the first scan mirror 206, the optical relay 210, and the substrate 402. A frame section 706 of the WHUD 702 houses the second scan mirror 208 and portions of the first scan mirror 206, the optical relay 210, and the substrate 402. As shown by the view 700 of FIG. 7, the incoupler 212 and the outcoupler 214 of the waveguide 205 (not fully shown in the views of FIGS. 7 and 8), are each embedded in or otherwise disposed on the lens 708 (one embodiment of, for example, lens 110 of FIG. 1). As described previously, laser light output by the optical engine 202 (e.g., laser light 218, FIG. 5) is routed to the incoupler 212 via at least the first scan mirror 206, the optical relay 210, and the second scan mirror 208. The first scan mirror 206 oscillates or otherwise rotates to scan the laser light along a first scanning axis, and the second scan mirror 208 oscillates or otherwise rotates to scan the laser light along a second scanning axis that is perpendicular to the first scanning axis. Laser light reflected by the second scan mirror 208 converges to a line at the incoupler 212. Focused laser light received at the incoupler 212 is routed to the outcoupler 214 via the waveguide 205. The laser light received at the outcoupler 214 is then directed out of the waveguide 205 (e.g., toward the eye of a user of the WHUD 702).

FIGS. 9 and 10 illustrate, respectively, a side perspective view and a top perspective view of a laser scanning system 900 (sometimes referred to herein as a "laser projector 900"). In the present example, the laser scanning system 900 includes an embodiment of the optical scanner 204 and an embodiment of the optical engine 202 of FIG. 2, with like reference numerals denoting like components. In the example of the laser scanning system 900 the optical engine 202 includes one or more EEL laser sources, such that the optical engine 202 produces laser light having an elliptical beam profile (sometimes referred to herein as an elliptical cross-section). In the present example, the first scan mirror 206 of the optical scanner 204 is an elliptical MEMS mirror having an elliptical mirror plate 902. The optical scanner further includes a (first) lens 904, a (second) lens 906, and the second scan mirror 208 having a reflective surface 908 (e.g., a mirror plate). The lenses 904 and 906, together, may correspond to an embodiment of the optical relay 210 of FIG. 2. In some embodiments, the lenses 904 and 906 are shaping lenses, such as collimation lenses. In some embodiments, the lenses 904 and 906 form a line scan optical relay between the first scan mirror 206 and the second scan mirror 208. Herein, a line scan optical relay is an optical relay disposed between two scan mirrors (e.g., MEMS mirrors), where the optical relay predominantly relays light between the two scan mirrors in only one scan direction (e.g., the first scan mirror 206 only oscillates to scan received light along a first scanning dimension 910), and where the second scan mirror (e.g., the second scan mirror 208) relays light onto an incoupler grating of a waveguide (e.g., onto the incoupler 212 of the waveguide 205 of FIG. 2) in a second scan direction, such that the light is drawn in a path across the incoupler grating, where the path is substantially non-parallel to the scanning axis 116.

While the present example is provided in the context of a scanning laser system that includes a line-scan optical relay, it should be understood that the elliptical MEMS mirrors described herein may be used in connection with other types of optical systems. For example, the elliptical MEMS mirror of the embodiments described herein can be used in any scanning laser system that includes a 1-dimensional optical relay (e.g., that only directs light along a single axis) following the elliptical MEMS mirror. For example, a laser projector may include a cascading series of optical relays, such that first and second scan mirrors are coupled via a one-dimensional optical relay, and the output of the second scan mirror is directed onto the incoupler grating of the waveguide via a two-dimensional optical relay, where the first one-dimensional MEMS is the elliptical MEMS mirror.

During operation of the laser scanning system 900, the optical engine 202 emits a light beam (an embodiment of laser light 218 of FIG. 2) having an elliptical cross-section toward the elliptical mirror plate 902 of the first scan mirror 206. The light beam 218 may carry image data that is to be projected onto a display surface (e.g., of a lens or screen) by the laser scanning system 900 (e.g., via a waveguide, such as an embodiment of the waveguide 205 of FIG. 2, coupled to an output of the laser scanning system 900). An electrode of the first scan mirror 206 is actuated to cause the elliptical mirror plate 902 to oscillate along a single rotation axis of the first scan mirror 206. The oscillation of the elliptical mirror plate 902 causes the light beam 218, upon being reflected by the elliptical mirror plate 902, to be scanned back and forth along the first scanning dimension 910. In some embodiments, the lenses 904 and 906 reshape received light beams (e.g., magnifying a received light beam 218 along its cross-sectional minor axis or reducing the light beam 218 along its cross-sectional major axis to circularize the light beam 218). The lens 904 is disposed in the optical path of the light beam 218, such that the lens 904 receives the light beam 218 as it is scanned along the first scanning dimension 910. The lens 904 outputs the light beam 218 toward the lens 906 along a plane 912. The lens 906 focuses the light beam 218 onto the reflective surface 908 of the second scan mirror 208. In some embodiments, the reflective surface 908 of the second scan mirror 208 includes multiple mirror plates, which may be organized as an array of MEMS mirror plates, and which may be oscillated independently or collectively via actuation of one or more electrodes of the second scan mirror 208. In other embodiments, the reflective surface 908 of the second scan mirror 208 includes only a single mirror plate. The light beam 218 is scanned along the reflective surface 908 in a line that is substantially in-plane with the first scanning dimension 910 and the plane 912, and the oscillation of the reflective surface 908 causes the light beam 218 be scanned along a second scanning dimension, such that the light beam 120 is scanned across a post-mirror scan region 914, which converges to a pupil plane. In some embodiments, the pupil plane defines a non-linear path, such as an arc. In some embodiments, the pupil plane defines a linear path, such as a substantially straight line. In some embodiments, the pupil plane substantially overlaps an incoupler of a waveguide, such as the incoupler 212 and the waveguide 205 of FIG. 2, where the waveguide routes the light beam 218 to from the incoupler to an outcoupler of the waveguide through which the light beam 218 is output a display area or directly onto the eye of a user.

As shown, no optical power is needed in the perpendicular direction 916 (e.g., that is substantially perpendicular to the plane 912) to relay the light from the first scan mirror 206 to the second scan mirror 208, so the optical surfaces of the lenses 904 and 906 can be used to shape the light beam 218 from having a non-circular, elliptical cross-section to having a substantially circular cross-section, since the entrance pupil and exit pupil of either or both of the lenses 904 and 906 may have different magnifications in the scanning direction than in the perpendicular direction. According to various examples, the differences in magnification provided by the lenses 904 and 906 cause height along the major axis of the elliptical cross-section of the light beam 218 may be shortened or the width along the minor axis of the elliptical cross-section of the light beam 218 may be widened by either or both of the lenses 904 and 906, thereby reshaping the light beam 218 to have a substantially circular cross-section rather than an elliptical cross-section after reflection off of the elliptical mirror plate 902. As will be described, the elliptical shape of the elliptical mirror plate 902 of the first scan mirror 206 provides various advantages to the first scan mirror 206, including a higher resonant frequency, less dynamic deformation, less squeeze-film damping, and reduced power consumption compared to an otherwise similar scan mirror having a circular mirror plate.

Figure 11:
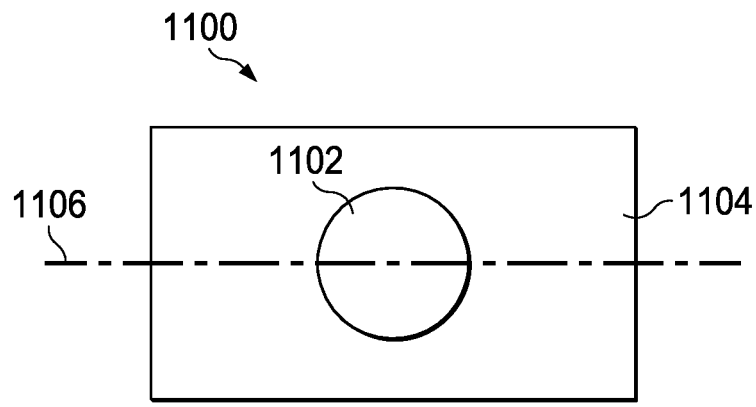
FIG. 11 is a top-down view of a MEMS die that includes a circular mirror plate.
Figure 12:
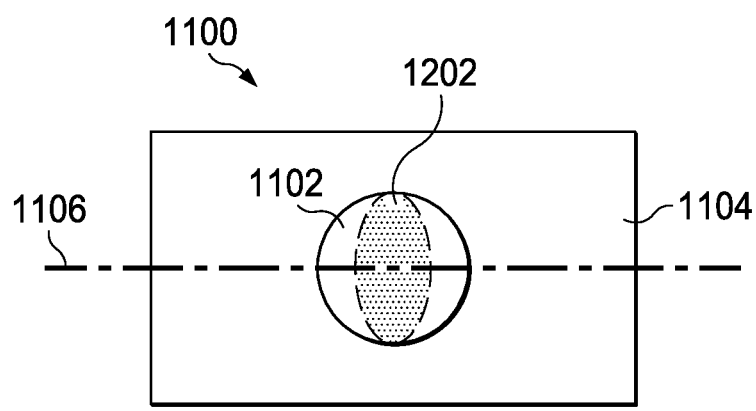
FIG. 12 is a top-down view of a MEMS die having a circular mirror plate on which an elliptical light beam is incident, where the elliptical light beam is within a boundary defined by the perimeter of the circular mirror plate of the MEMS die.
Figure 13:
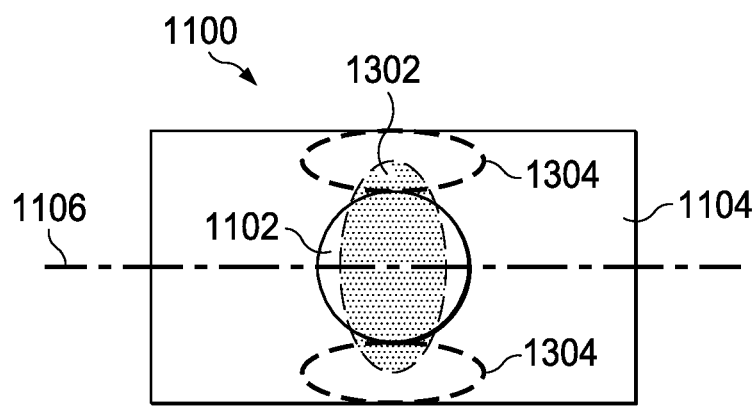
FIG. 13 is a top-down view of a MEMS die having a circular mirror plate on which an elliptical light beam is incident, where the elliptical light beam exceeds a boundary defined by the perimeter of the circular mirror plate of the MEMS die.

FIG. 11 shows a conventional scan mirror 1100 having a circular mirror plate 1102 on a substrate 1104 and being configured to oscillate the circular mirror plate 1102 about an axis of rotation 1106 during operation of the scan mirror 1100. In the present example, the conventional scan mirror 1100 is a MEMS mirror. FIG. 12 shows an example in which an elliptical light beam 1202 is incident on the circular mirror plate 1102 and is fit to the circular mirror plate 1102 such that the elliptical light beam 1202 falls within a boundary defined by the perimeter of the circular mirror plate 1102. In the present example, at least half of the surface of the circular mirror plate 1102 is not used to reflect the elliptical light beam 1202, which is inefficient. FIG. 13 shows an example in which an elliptical light beam 1302 (having a larger cross-sectional area than the elliptical light beam 1202 of FIG. 12) is incident on the circular mirror plate 1102 and is fit to the circular mirror plate 1102 such that portions 1304 of the elliptical light beam 1302 exceed the boundary defined by the perimeter of the circular mirror plate 1102. Depending on the dimensions of the elliptical light beam 1302, portions 1304 of the elliptical light beam 1302 that are clipped (i.e., that are not incident on the circular mirror plate 1102) can correspond to more than half of the cross-sectional area of the elliptical light beam 1302 and can result in significant optical power losses attributable to the scan mirror 1100.

In one example, the elliptical light beam 1302 has a beam width along the minor axis of the elliptical cross-section of the elliptical light beam 1302 that is set to 40% of its beam height along the major axis of the elliptical cross-section of the elliptical light beam 1302, where the diameter of the circular mirror plate 1102 is 1 mm, and where the elliptical light beam 1302 is to pass through an aperture that is 1 mm in diameter. In the present example, if the elliptical light beam 1302 is fit to the width of the circular mirror plate 1102, with width defined as the diameter of the circular mirror plate 1102 along the axis of rotation 1106, the power efficiency of an optical system that includes the scan mirror 1100 falls from about 86.5% to about 27.4% due to clipping of the portions 1304.

Figure 14:
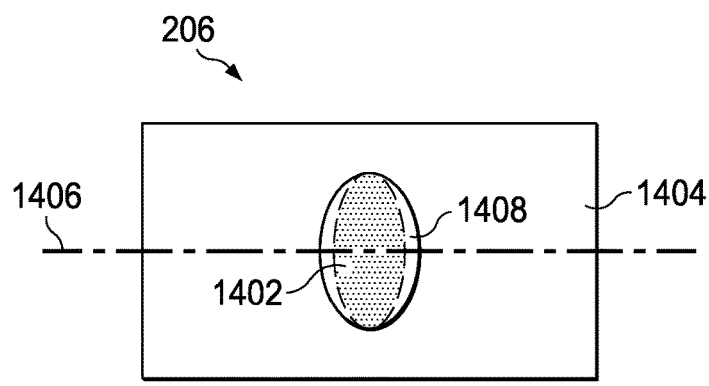
FIG. 14 is a top-down view of a MEMS die having an elliptical mirror plate on which an elliptical light beam is incident, where the elliptical light beam is incident mostly within a boundary defined by the perimeter of the elliptical mirror plate of the MEMS die, and the major axes of both the elliptical light beam and the elliptical mirror plate are perpendicular to an axis of rotation of the MEMS die, in accordance with some embodiments.

In order to reduce power losses due to clipping and to allow for efficient usage of the reflective surface of the scan mirror, a scan mirror having an elliptical mirror plate may be used (e.g., implemented as the first scan mirror 206) in place of one having a circular mirror plate. FIG. 14 shows an example embodiment of the first scan mirror 206 of FIGS.

2, 9, and 10 having an elliptical mirror plate 1408 (an embodiment of the elliptical mirror plate 902 of FIGS. 9 and 10) on a substrate 1404. The first scan mirror 206 is configured to rotate or oscillate the elliptical mirror plate 1408 along an axis of rotation 1406 during operation of the first scan mirror 206. A ratio of semi-major axis length to semi-minor axis length of the elliptical mirror plate 1408 (e.g., of the reflective elliptical face thereof), in some embodiments, is in a range of about 2 to about 4. In some embodiments, the semi-major axis of the elliptical mirror plate 1408 is between about 1 mm to about 2 mm and the semi-minor axis of the elliptical mirror plate 1408 is between about 0.25 mm to about 1 mm. That is, the elliptical mirror plate 1408 may have a semi-major axis that is about two to about four times the length of its semi-minor axis. An elliptical light beam 1402 (an embodiment of the laser light 218 of FIGS. 2, 9, and 10) is incident on the elliptical mirror plate 1408 and is substantially fit to the elliptical mirror plate 1408 such that the elliptical beam profile of the elliptical light beam 1402 is incident on the elliptical reflective surface of the elliptical mirror plate 1408 and substantially overlaps the elliptical mirror plate 1408 (e.g., with about 87%, which may correspond to the 1/e^2 beam width, of the elliptical light beam 1402 being incident on the elliptical mirror plate and the remainder being clipped). In some embodiments, the elliptical light beam 1402 may be emitted by one or more EEL laser sources such those of the embodiment of the optical engine 202 of FIGS. 9 and 10. The minor axis (i.e., the shorter diameter) of the elliptical mirror plate 1408 may be aligned substantially in parallel with the axis of rotation 1406, while the major axis (i.e., the longer diameter) of the elliptical mirror plate 1408 may aligned to be substantially perpendicular to the axis of rotation 1406. The shape and dimensions of the elliptical mirror plate 1408, when compared to a circular mirror plate, allow for a substantially larger percentage of the surface of the elliptical mirror plate 1408 to be overlapped by the elliptical light beam 1402 without significant clipping. That is, in some embodiments, most or all of the mirrored surface of the elliptical mirror plate 1408 is utilized to reflect the incident elliptical light beam 1402 while retaining or substantially retaining optical power efficiency.

In addition to providing improved optical power efficiency in laser scanning systems with elliptical light beams, the elliptical mirror plate 1408 of the first scan mirror 206 provides various benefits to the operation of the first scan mirror 206, compared to that of an otherwise similar scan mirror having a circular mirror plate. In some embodiments, the first scan mirror 206, due to the shape of the elliptical mirror plate 1408, has a higher resonant frequency, experiences less dynamic deformation and less squeeze-film damping, and consumes less power compared to an otherwise similar scan mirror that includes a circular mirror plate.

For example, in the case of a laser scanning system, such as the laser scanning system 900 of FIGS. 9 and 10, in which the first scan mirror 206 has an elliptical mirror plate 1408 corresponding to the example of FIG. 14 and scans the light beam along a fast axis and a separate MEMS device (e.g., the second scan mirror 208 of FIGS. 2, 9, and 10) scans the light beam 218 along a slow axis, the higher resonant frequency of the first scan mirror 206 allows more raster lines to be displayed in the slow axis, since the higher frequency reduces the amount of time that it takes to project a single raster line in the fast axis. Hence, more raster lines can be projected in a slow axis at the same frame rate. In the present example, the reduction in dynamic deformation of the elliptical mirror plate 1408 compared to a circular mirror plate of an otherwise similar scan mirror (e.g., the scan mirror 1100 of FIGS. 11-13) under the same angular acceleration is attributable to a reduction in moment of inertia along the rotational axis of the first scan mirror 206, with the reduction in moment of inertia being attributable to the minor axis of the elliptical mirror plate 1408 along the axis of rotation of the first scan mirror 206 is shorter than the diameter of a circular mirror plate along the axis of rotation if the circular mirror plate has the same surface area as that of the elliptical mirror plate 1408. In present example, a reduction in squeeze-film damping of the elliptical mirror plate 1408 of the first scan mirror 206 compared to an otherwise similar scan mirror with a circular mirror plate (e.g., the scan mirror 1100 of FIGS. 11-13) is similarly attributable to the minor axis of the elliptical mirror plate 1408 along the axis of rotation 1406 of the first scan mirror 206 being shorter than the diameter of the circular mirror plate along the axis of rotation if the circular mirror plate has the same surface area as that of the elliptical mirror plate 1408. In the present example, the first scan mirror 206 consumes less power compared to a MEMS mirror having a circular mirror plate specifically during dynamic or resonant operation of the first scan mirror 206.

Figure 15:
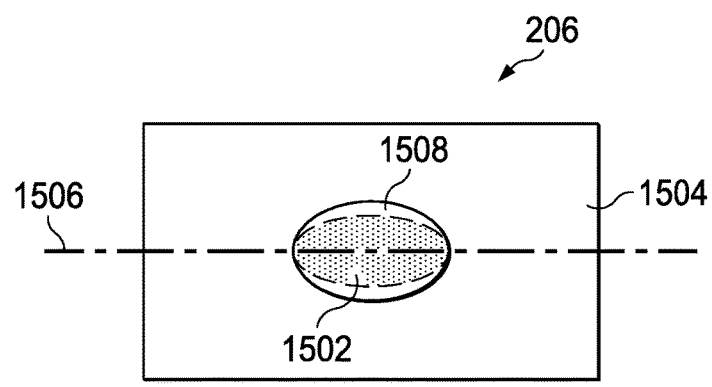
FIG. 15 is a top-down view of a MEMS die having an elliptical mirror plate on which an elliptical light beam is incident, where the elliptical light beam is incident mostly within a boundary defined by the perimeter of the elliptical mirror plate of the MEMS die, and the major axes of both the elliptical light beam and the elliptical mirror plate are parallel to an axis of rotation of the MEMS die, in accordance with some embodiments.

FIG. 15 shows an example embodiment of the first scan mirror 206 of FIGS. 2 and 9 in which the first scan mirror 206 an elliptical mirror plate 1508 on a substrate 1504 and being configured to oscillate the elliptical mirror plate 1508 along an axis of rotation 1506 (sometimes referred to herein as a "rotational axis 1506") during operation of the first scan mirror 206. An elliptical light beam 1502 is incident on the elliptical mirror plate 1508 and is substantially fit to the elliptical mirror plate 1508 such that the elliptical beam profile of the elliptical light beam 1502 that is incident on the elliptical mirror plate 1508 overlaps the elliptical mirror plate 1508 while substantially overlapping the boundary defined by the perimeter of the elliptical mirror plate 1508 such that the elliptical light beam 1502 covers most or all of the mirrored surface of the elliptical mirror plate 1508, with about 87% of the elliptical light beam 1502 being incident on the elliptical mirror plate 1508 and the remainder being clipped. In some embodiments, the elliptical light beam 1502 may be emitted by one or more EEL laser sources such as those of the embodiment of the optical engine 202 of FIGS. 9 and 10. The minor axis (i.e., the shorter diameter) of the elliptical mirror plate 1508 may be aligned substantially perpendicular to the axis of rotation 1506, while the major axis (i.e., the longer diameter) of the elliptical mirror plate 1508 may be aligned substantially parallel with the axis of rotation 1506. The shape and dimensions of the elliptical mirror plate 1508, when compared to a circular mirror plate, allow for a substantially larger percentage of the surface of the elliptical mirror plate 1508 to be overlapped by the elliptical light beam 1502 without significant clipping. That is, in some embodiments, most or all of the mirrored surface of the elliptical mirror plate 1508 may be utilized to reflect the incident elliptical light beam 1502 while retaining or substantially retaining optical power efficiency.

Figure 16:
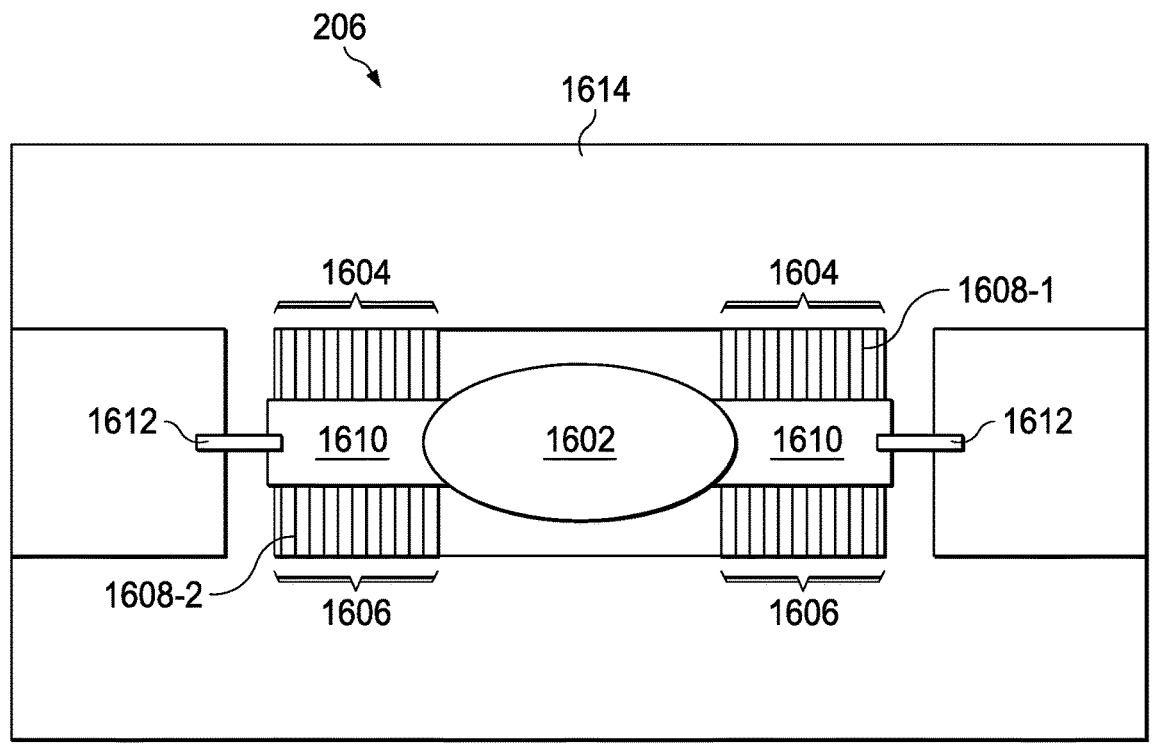
FIG. 16 is a top-down view of a MEMS die having an elliptical mirror plate with a semi-major axis that is approximately twice as long as its semi-minor axis, in accordance with some embodiments.

For example, the equation of motion (EoM) for a resonant MEMS mirror, such as some embodiments of the first scan mirror 206, can generally be expressed as provided in Equation 1:

$$J\ddot{\theta}(t)+b\dot{\theta}(t)+k\theta(t)=T_m \qquad (\text{EQ. 1})$$

where J represents the moment of inertia, θ represents the angle or angular displacement, b represents the damping coefficient, k represents the torsional stiffness, t represents time, and $T_m$ represents the mechanical torque applied to the MEMS mirror. For the embodiment of the first scan mirror 206 of FIG. 15, the EoM can be simplified to its canonical form, as shown in Equation 2:

$$\ddot{\theta}(t) + \frac{\omega_0}{Q}\dot{\theta}(t) + \omega_0^2 \theta(t) = \frac{1}{2J}\left(\frac{dC_1(\theta)}{d\theta}V_r^2 + \frac{dC_2(\theta)}{d\theta}V_r^2\right) \quad \text{(EQ. 2)}$$

where the damping and stiffness are represented by a quality factor Q and resonance $\omega_0$, the mechanical torque is replaced by electrostatic torque generated by an actuation voltage $V_r$ applied to the rotors of the first scan mirror 206 (e.g., rotors 1610 of FIG. 16), and $C_1$ and $C_2$ respectively represent the capacitance between the rotors and the first stator of the first scan mirror 206 (e.g., stator 1604 of FIG. 16) and the capacitance between the two rotors and the second stator of the first scan mirror 206 (e.g., stator 1606 of FIG. 16). Since electrostatic torque is conservative, it is derived from electric potential energy stored between the rotors and the two stators.

In the present example, a scan mirror having a circular mirror plate will be considered for purposes of comparison to the embodiment of the first scan mirror 206 of FIG. 15. It should be understood that in the present example, properties such as thickness and material density of the circular mirror plate and the elliptical mirror plate 1508 being compared are assumed to be the same, the semi-major axis of the elliptical mirror plate 1508 is assumed to be equal to the radius of the circular mirror plate, and the semi-major axis of the elliptical mirror plate 1508 is assumed to be twice as long as its semi-minor axis. The moment of inertia, $J_c$, of the circular mirror plate defined with respect to a cartesian axes x, y, and z can be derived according to Equation 3:

$$J_c = \iiint r^2 \rho \, dx \, dy \, dz = \int_{-a}^{a} y^2 \, \rho \, th \, 2\sqrt{a^2 - y^2} \, dy = \frac{1}{4}\pi \, \rho \, th \, a^4 \quad \text{(EQ. 3)}$$

where r represents the radius of the circle that defines the circular mirror plate and is equal to the length of the semi-major axis, a, of the elliptical mirror plate 1508, $\rho$ represents the material density of each mirror plate, and th represents the thickness of each mirror plate, respectively.

In contrast, the moment of inertia $J_e$ of an elliptical mirror plate of a MEMS mirror, such as the elliptical mirror plate 1508 of the first scan mirror 206 of FIG. 15, can be derived according to Equation 4:

$$J_e = \int_{-b}^{b} y^2 \, \rho \, th \, 2a\sqrt{1 - \frac{y^2}{b^2}} \, dy = \frac{1}{8}\left(\frac{1}{4}\pi \, \rho \, th \, a^4\right) \quad \text{(EQ. 4)}$$

where a is the length of the semi-major axis of the elliptical beam profile of the elliptical mirror plate 1508 and b is the length of the semi-minor axis of the elliptical beam profile of the elliptical mirror plate 1508. In the present example, a is equal to half of b. In the present example, as illustrated in Equation 4, the elliptical mirror plate 1508 has ⅛ of the moment of inertia of the circular mirror plate, because its semi-minor axis is half its semi-major axis in length.

Figure 17:
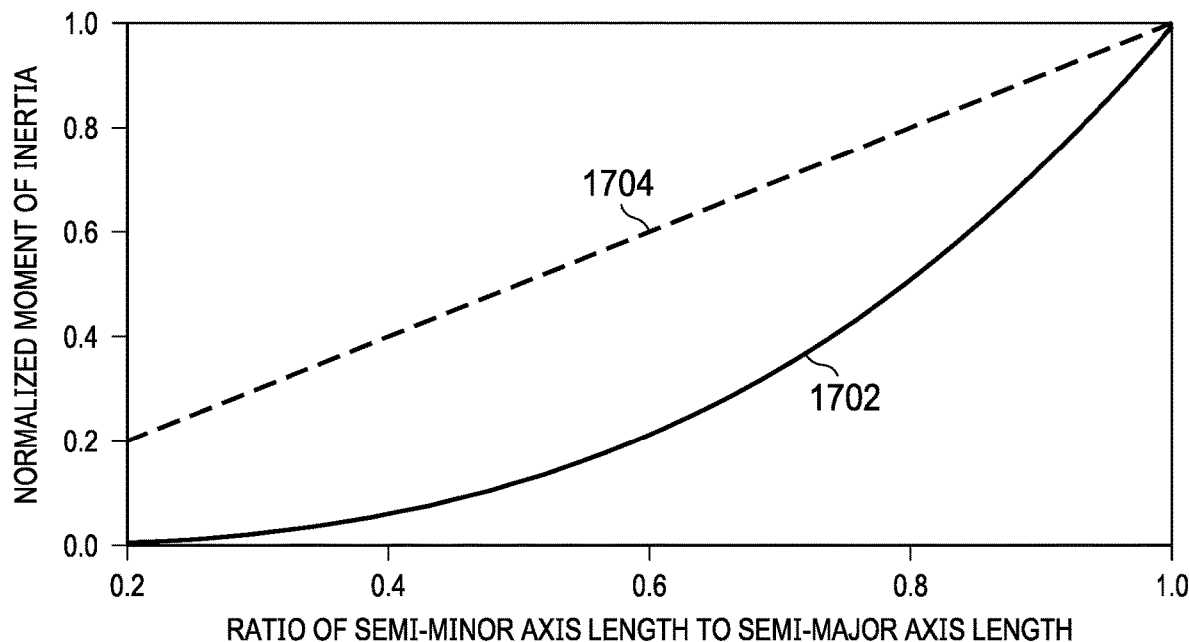
FIG. 17 is a chart illustrating a dotted line that represents the ratio of the length of the semi-minor axis to the length of the semi-major axis of an elliptical MEMS mirror and, separately, a solid line that represents the relative moment of inertia of an elliptical MEMS mirror with respect to that of a circular mirror plate as the ratio increases.
Figure 18:
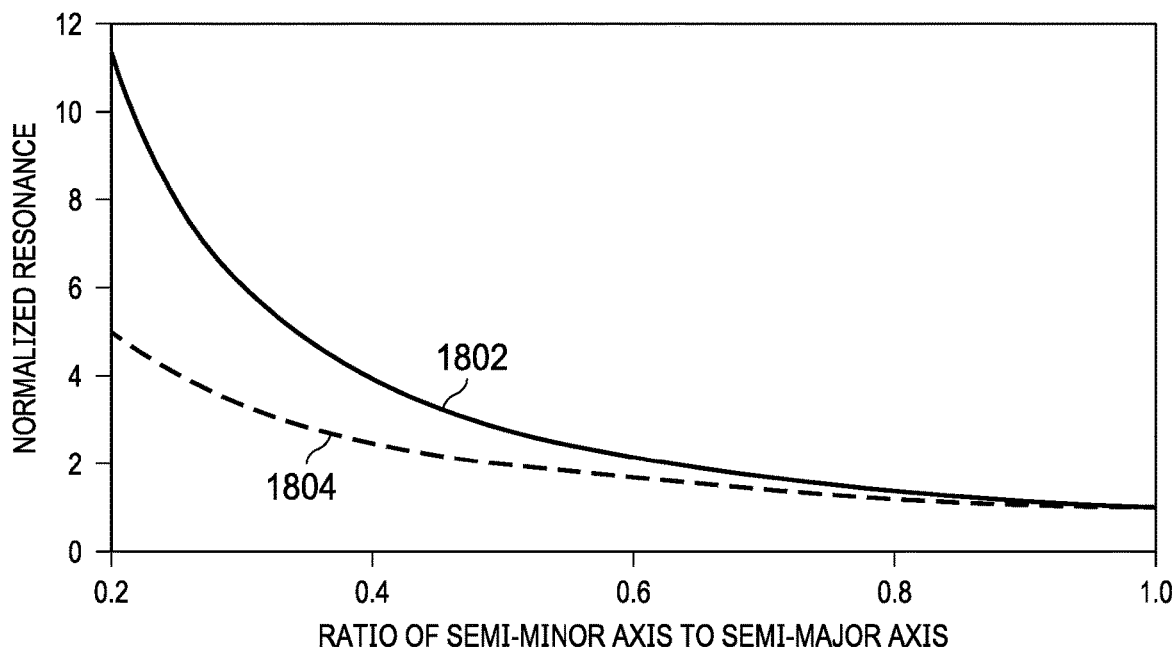
FIG. 18 is a chart illustrating a dotted line that represents the ratio of the length of the semi-minor axis to the length of the semi-major axis of an elliptical MEMS mirror and, separately, a solid line that represents the relative resonant frequency of an elliptical MEMS mirror with respect to that of a circular MEMS mirror as the ratio increases.

Equation 5 reduces Equations 3 and 4 to provide the relationship between the respective resonant frequencies, $\omega_c$ and $\omega_e$, of the circular and elliptical mirror plates:

$$\omega_c = \sqrt{\frac{k}{J_c}}, \, \omega_e = \sqrt{\frac{k}{J_e}} = 2\sqrt{2}\sqrt{\frac{k}{J_c}} = 2.83 \, \omega_c \quad \text{(EQ. 5)}$$

where k is the torsional stiffness of both the circular and elliptical mirror plates. As shown, given an elliptical mirror plate having a semi-major axis that is twice the length of its semi-minor axis, a 2.83 times greater resonant frequency is achieved when compared to the resonant frequency of a corresponding circular mirror plate having a radius equal to the length of the semi-major axis of the elliptical mirror plate. For example, FIG. 17 shows a chart 1700 that includes a solid curve 1702 representing a relationship between the moment of inertia of the elliptical mirror plate (e.g., an embodiment of the elliptical mirror plate 1508 of FIG. 15) normalized with respect to a circular mirror plate having a radius equal to the semi-major axis of the elliptical mirror plate, versus different ratios of semi-minor axis length to semi-major axis length of the elliptical mirror plate. The chart 1700 further includes a dotted curve 1704, which represents the ratio of the semi-minor axis to the semi-major axis of the elliptical mirror plate. As another example, FIG. 18 shows a chart 1800 that includes a solid curve 1802 representing a resonant frequency of an elliptical mirror plate (e.g., the elliptical mirror plate 1508 of FIG. 15) normalized with respect to a circular mirror plate having a radius that is equal to the length of the semi-major axis of the elliptical mirror plate, versus different ratios of semi-minor axis length to semi-major axis length of the elliptical mirror plate. The chart 1800 further depicts a dotted curve 1804, which represents the ratio of the semi-major axis to the semi-minor axis of the elliptical mirror plate.

Returning to the example of FIG. 15, the first scan mirror 206 of the present example also experiences less dynamic deformation compared to that experienced by the edge of a corresponding circular mirror plate having a radius equal to the length of the semi-major axis of the elliptical mirror plate 1508 under the same angular acceleration due to the semi-minor axis of the elliptical mirror plate 1508 being less than the radius of the circular mirror plate.

The first scan mirror 206 of the present example also experiences less squeeze-film damping compared to an otherwise similar scan mirror having a circular mirror plate. There are three major damping components in a MEMS mirror: structural damping, linear viscous damping due to Couette flow between comb fingers of the in-plane comb drivers, and nonlinear squeeze-film damping due to the relatively large ratio of surface area to volume of the mirror plate. Since it has less surface area orthogonal to its rotational axis 1506, the elliptical mirror plate 1508 experiences less squeeze-film damping compared to a circular mirror plate having a radius equal in length to the semi-major axis of the elliptical mirror plate 1508, which results in a comparatively higher quality factor as well as more stable and robust operation, even in circumstances with higher external disturbance. Another benefit of elliptical MEMS mirrors, and particularly that of the present example of the first scan mirror 206, is a reduction in power consumption compared to a circular mirror plate having a radius that is equal in length to the semi-major axis of the elliptical mirror plate 1508 of the first scan mirror 206. In static or quasi-static modes, circular mirror plates and elliptical mirror plates contribute similarly to the power consumption of their respective MEMS mirrors because the moment of inertia of the mirror plate is a dynamic load. However, in some embodiments the main operating mode of the first scan mirror 206 is dynamic (i.e., in which the first scan mirror 206 is oscillating at its resonant frequency), and the actuation voltage of the first scan mirror 206 is proportional to its moment of inertia.

For example, in some embodiments the elliptical mirror plate 1508 of the first scan mirror 206 has a semi-major axis that is about four times as long as its semi-minor axis. When compared to an otherwise similar MEMS mirror having a circular mirror plate with the same surface area as that of the elliptical mirror plate 1508, the first scan mirror 206 of such embodiments has only one-fourth of the moment of inertia of the MEMS mirror with the circular mirror plate. This reduction in moment of inertia of the first scan mirror 206 causes larger opening angles with the same actuation voltage, assuming that the resonant frequency remains the same by adjusting torsional stiffness, accordingly.

Figure 19:
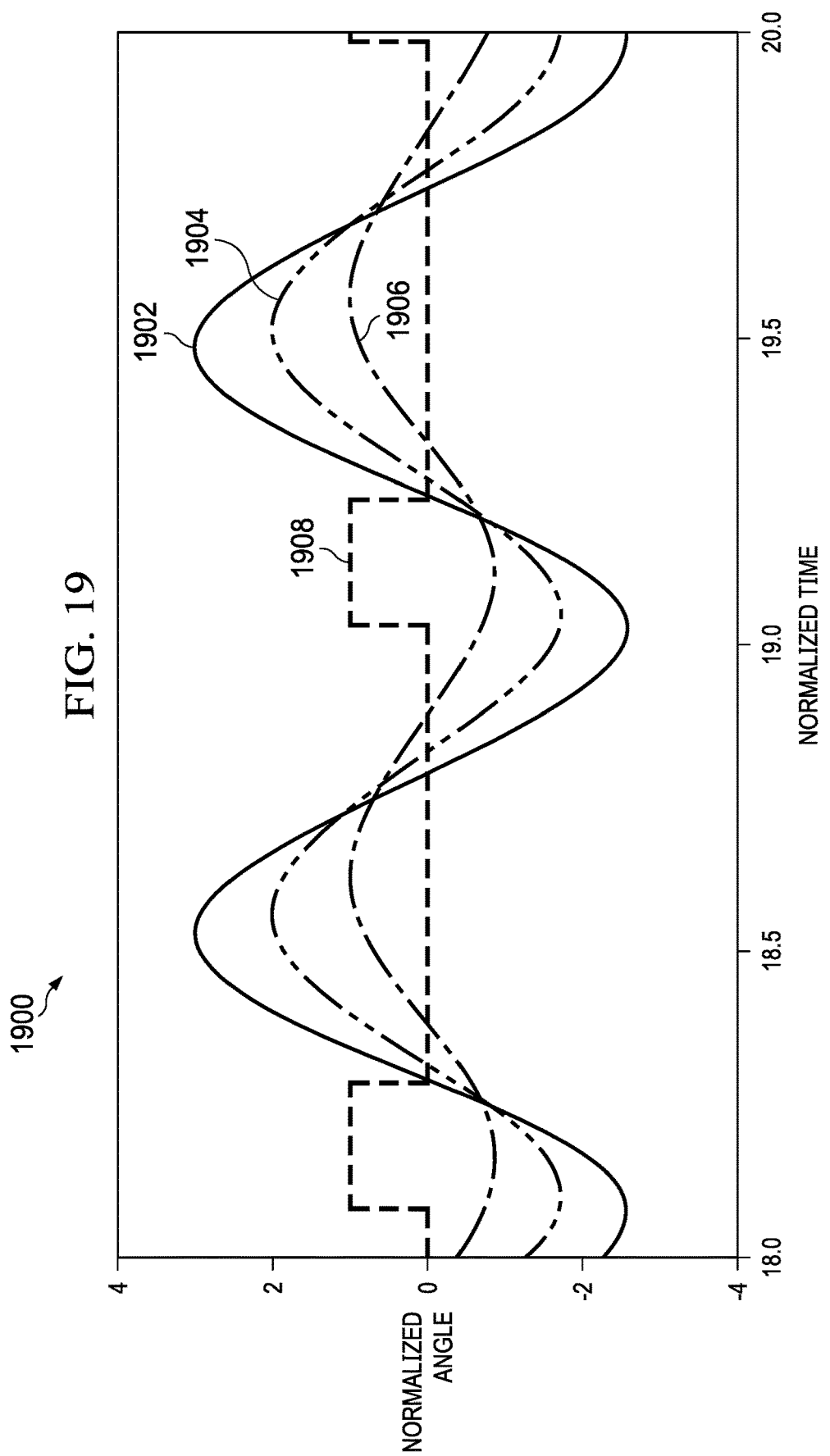
FIG. 19 is a chart illustrating the opening angles over time for three different elliptical MEMS mirrors, each having different moments of inertia and being driven by the same single-pulse pulse-width modulation (PWM) actuation signal.

FIG. 19 shows an illustrative chart 19 that shows the opening angles over time during resonant/dynamic operation for three different elliptical MEMS mirrors (embodiments of the first scan mirror 206 of the example of FIG. 15), each having respectively different moments of inertia. The curve 1902 represents an elliptical MEMS mirror having a moment of inertia of about 0.333. The curve 1904 represents an elliptical MEMS mirror having a moment of inertia of 0.5. The curve 1906 represents an elliptical MEMS mirror having a moment of inertia of 1. The opening angles of each of the curves 1902, 1904, and 1906 are normalized to the peak opening angle of the curve 1906. The curve 1908 represents a pulse-width modulation (PWM) actuation signal that drives the oscillation of each MEMS mirror. As shown, the curve 1904 achieves a peak opening angle of about twice that of the curve 1906, and the curve 1902 achieves a peak opening angle of about three times that of the curve 1906. Assuming an ideal linear relationship between peak opening angle and actuation voltage, the MEMS mirror corresponding to the curve 1902 could be driven at ⅓ of the actuation voltage of the MEMS mirror corresponding to the curve 1906, and would still achieve the same opening angle as the MEMS mirror corresponding to the curve 1906, due to the difference in moment of inertia between these MEMS mirrors.

Accordingly, returning to the example of the first scan mirror 206 of FIG. 15 in which the elliptical mirror plate 1508 has a semi-major axis that is about four times longer than its semi-minor axis and that a moment of inertia of about one-fourth that of an otherwise similar MEMS mirror with a circular mirror plate with substantially the same surface area as that of the elliptical mirror plate 1508, the first scan mirror 206 can be operated with an actuation voltage that is one-fourth of that used to actuate the MEMS mirror with the circular mirror plate, and the first scan mirror 206 would still achieve about the same opening angle as that of the MEMS mirror with the circular mirror plate. Since power consumption is proportional to voltage squared, this indicates that the first scan mirror 206 of the present example would consume about one-sixteenth of the power of the MEMS mirror having a circular mirror plate to drive its oscillation.

FIG. 16 shows an illustrative example in which the first scan mirror 206 of FIGS. 2, 9, and 10 includes an elliptical mirror plate 1602, which has a semi-major axis having a length (e.g., about 0.5 mm) that is approximately twice the length of its semi-minor axis (e.g., about 0.25 mm). In some embodiments, the eccentricity of the elliptical mirror plate 1602 is about 0.86. As shown, the first scan mirror 206 includes stators 1604 and 1606, which each include in-plane comb drivers 1608 that drive oscillation of the elliptical mirror plate 1602 during operation of the first scan mirror 206. In some embodiments, the rotors 1610 also include in-plane comb drivers that include multiple comb fingers (not shown). As the rotors 1610 rotate, the size of the area of the rotors 1610 that overlaps the stators 1604 and 1606 changes, resulting in a change in capacitance between the in-plane comb drivers 1608 of the stators 1604 and 1606 and the in-plane comb drivers of the rotors 1610. This capacitance change with respect to its rotational angle is part of its EoM. The first scan mirror 206 also includes rotors 1610. In some embodiments, an actuation voltage (e.g., a high voltage pulse width modulation signal) may be applied to the rotors 1610 to drive oscillation of the elliptical mirror plate 1602. In some embodiments, differential high voltage pulse width modulation signals are applied to the stators 1604 and 1606 to drive oscillation of the elliptical mirror plate 1602, where the differential high voltage pulse width modulation signals are complementary and 180 degrees out of phase with respect to one another. The elliptical mirror plate 1602 may be suspended from two torsional bars 1612 that physically couple the rotors 1610 to the substrate 1614, where the elliptical mirror plate rotates about the torsional bars 1612 during oscillation.

While the elliptical mirror plate 1602 is shown here to have a major axis that is parallel to its rotational axis, similar to the arrangement of the example of FIG. 15, it should be understood that in other embodiments the semi-major axis of the elliptical mirror plate 1602 may be perpendicular to its axis of rotation, similar to the arrangement of the example of FIG. 14. Accordingly, the present embodiment of the first scan mirror 206 may provide advantages over MEMS mirrors with circular mirror plates that are similar to those described above in connection with the examples of FIGS. 14 and 15, depending on how the elliptical mirror plate 1602 is dimensioned with respect to its axis of rotation.

It should be understood that the oscillation of the embodiments of the first scan mirror 206 of FIGS. 2, 9, 10, 14, and 15 may be stabilized and driven using components corresponding to any or all of the stators 1604 and 1606, in-plane comb drivers 1608, torsional bars 1612, and rotors 1610 of the present example.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
   an optical engine configured to emit a light beam having an elliptical cross-section;
   a first micro-electromechanical system (MEMS) mirror comprising an elliptical mirror plate and being configured to oscillate the elliptical mirror plate to reflect the light beam along a first scanning axis;
   at least one shaping lens configured to receive the light beam reflected from the elliptical mirror plate and reshape the light beam to have a substantially circular cross-section; and
   a second MEMS mirror configured to scan the light beam having the substantially circular cross-section along a second scanning axis different from the first scanning axis.

2. The system of claim 1, wherein the second scanning axis is orthogonal to the first scanning axis.

3. A wearable heads-up display comprising a laser scanning system comprising the system of claim 1.

4. The system of claim 1, wherein the elliptical cross-section of the light beam, upon being incident on the elliptical mirror plate, substantially overlaps an elliptical reflective surface of the elliptical mirror plate.

5. The system of claim 1, wherein the optical engine comprises at least one laser light source configured to generate and output the light beam.

6. The system of claim 5, wherein the optical engine comprises an edge-emitting semiconductor laser.

7. The system of claim 1, wherein a minor axis of the elliptical mirror plate is substantially orthogonal to an axis of rotation of the elliptical mirror plate.

8. The system of claim 1, wherein a major axis of the elliptical mirror plate is substantially orthogonal to an axis of rotation of the elliptical mirror plate.

9. The system of claim 1, wherein a minor axis of the elliptical mirror plate is approximately half as long as a major axis of the elliptical mirror plate.

10. The system of claim 1, wherein the first MEMS mirror comprises:
    the elliptical mirror plate configured to oscillate about a rotational axis;
    two rotors coupled to the elliptical mirror plate;
    a first stator that is disposed on a substrate and that is capacitively coupled to the two rotors; and
    a second stator that is disposed on the substrate and that is capacitively coupled to the two rotors, wherein the first stator and the second stator are configured to drive the oscillation of the elliptical mirror plate.

11. The system of claim 10, wherein the first stator comprises a first plurality of comb drivers, the second stator comprises a second plurality of comb drivers, and the first plurality of comb drivers and the second plurality of comb drivers are configured to drive the oscillation of the elliptical mirror plate.

12. The system of claim 11, further comprising:
    at least two torsional bars configured to couple the two rotors to the substrate such that the elliptical mirror plate is suspended from the at least two torsional bars.

13. A system comprising:
    an optical engine configured to emit an elliptical light beam;
    a first micro-electromechanical system (MEMS) mirror comprising an elliptical mirror plate and being configured to receive the elliptical light beam and to oscillate the elliptical mirror plate to reflect the elliptical light beam along a first scanning axis;
    at least one shaping lens configured to receive the elliptical light beam reflected from the first MEMS mirror and configured to reshape the elliptical light beam to have a substantially circular cross-section to produce a circular light beam;
    a second MEMS mirror configured to scan the circular light beam along a second scanning axis that is different from the first scanning axis; and
    a controller configured to control a timing of emission of the elliptical light beam from the optical engine for modulating the elliptical light beam to be perceived as images when output at an output of the system.

14. The system of claim 13, wherein the second scanning axis is orthogonal to the first scanning axis.

15. The system of claim 13, wherein a major axis of the elliptical mirror plate is substantially orthogonal to an axis of rotation of the elliptical mirror plate.

16. The system of claim 13, wherein a minor axis of the elliptical mirror plate is substantially orthogonal to an axis of rotation of the elliptical mirror plate.

17. The system of claim 13, wherein a minor axis of the elliptical mirror plate is approximately half as long as a major axis of the elliptical mirror plate.

18. The system of claim 13, wherein the optical engine is configured to modulate an intensity of the elliptical light beam for generating combined laser light reflecting a series of pixels of an image.

19. The system of claim 13, further comprising:
    two rotors coupled to the elliptical mirror plate;
    a first stator that is disposed on a substrate and that is capacitively coupled to the two rotors; and
    a second stator that is disposed on the substrate and that is capacitively coupled to the two rotors, wherein the first stator and the second stator are configured to drive the oscillation of the elliptical mirror plate.

20. The system of claim 13, further comprising:
    at least one waveguide configured to receive the light beam from the second MEMS mirror and to project the light beam to an eye of a user.

21. The system of claim 20, wherein the at least one waveguide comprises:
    an incoupler;
    an outcoupler that outputs the light beam toward the eye of the user; and
    at least one portion that routes the light beam received by the incoupler to the outcoupler.

* * * * *